United States Patent
Senda et al.

(10) Patent No.: US 8,726,802 B2
(45) Date of Patent: May 20, 2014

(54) METHOD AND APPARATUS FOR CONTROLLING ELECTRIC SERVO PRESS

(75) Inventors: Masaki Senda, Kanagawa (JP); Hiroaki Yoshida, Kanagawa (JP); Akira Harada, Kanagawa (JP); Koichi Hishinuma, Kanagawa (JP); Hirokazu Kawabuchi, Kanagawa (JP); Hideyuki Matsuda, Kanagawa (JP); Yasuhiro Harada, Kanagawa (JP); Kazuki Honjo, Kanagawa (JP)

(73) Assignee: Aida Engineering, Ltd., Kanagawa (JP)

(*) Notice: Subject to any disclaimer, the term of this patent is extended or adjusted under 35 U.S.C. 154(b) by 339 days.

(21) Appl. No.: 12/960,704

(22) Filed: Dec. 6, 2010

(65) Prior Publication Data

US 2011/0132209 A1    Jun. 9, 2011

(30) Foreign Application Priority Data

Dec. 7, 2009 (JP) ................. 2009-277377

(51) Int. Cl.
*B30B 15/14* (2006.01)
(52) U.S. Cl.
USPC .............. 100/48; 100/50; 72/443; 72/452.5
(58) Field of Classification Search
USPC ........... 100/43, 46, 48, 50, 52; 72/443, 452.5, 72/20.1, 21.4
See application file for complete search history.

(56) References Cited

U.S. PATENT DOCUMENTS

| | | | |
|---|---|---|---|
| 5,491,647 A * | 2/1996 | O'Brien et al. | 701/99 |
| 5,692,404 A * | 12/1997 | Kirii et al. | 72/15.1 |
| 6,085,520 A * | 7/2000 | Kohno | 60/414 |
| 2003/0066332 A1 | 4/2003 | Teraoka | |
| 2008/0016940 A1 * | 1/2008 | Schmeink | 72/435 |
| 2009/0188295 A1 * | 7/2009 | Kuboe | 72/447 |
| 2010/0192788 A1 * | 8/2010 | Tanaka et al. | 100/214 |

FOREIGN PATENT DOCUMENTS

| | | |
|---|---|---|
| DE | 10 2007 030 016 A1 | 1/2008 |
| JP | 10-277797 A | 10/1998 |
| JP | 2002-144099 A | 5/2002 |

(Continued)

OTHER PUBLICATIONS

Machine translation for DE 102007030016.*
Machine translation for JP 2003181698.*
Machine translation for JP 10-277797.*
Machine translation for JP 2003181698.*

(Continued)

*Primary Examiner* — Shelley Self
*Assistant Examiner* — Leonel Vasquez
(74) *Attorney, Agent, or Firm* — McDermott Will & Emery LLP

(57) ABSTRACT

A controller for an electric servo press includes: a press load sensor for detecting a pressure force of the slide; a pressure-force determination device for determining whether the pressure force of the slide reaches one or a plurality of different pressure-force setting values based on the one or the plurality of different pressure-force setting values and an output signal of the press load sensor, and for generating a pressure-force achievement signal each time the pressure force of the slide reaches each of the one or the plurality of different pressure-force setting values; a servo motor drive controller for controlling driving of the servo motor; and a motion command device. In response to the pressure-force achievement signal, switching of a drive control mode by the servo motor drive controller is switched, and/or a motion to be commanded by the motion command device is switched.

20 Claims, 15 Drawing Sheets

(56) References Cited

FOREIGN PATENT DOCUMENTS

| | | |
|---|---|---|
| JP | 2003-154498 A | 5/2003 |
| JP | 2003-181698 A | 7/2003 |
| WO | 2007/022755 A2 | 3/2007 |
| WO | WO 2007/091935 A1 | 8/2007 |

OTHER PUBLICATIONS

Machine translation for JP 10-277797.* Machine translation for JP 2002-144099.*

European Search Report issued in application No. 10193749.8 issued on Apr. 4, 2012.

* cited by examiner

Fig. 5

| PRESSURE-FORCE SETTING VALUE (RATIO TO DESIGNATED PRESSURE FORCE) | CRANK ANGLE | SLIDE POSITION (HEIGHT ABOVE BDC) |
|---|---|---|
| 10% | θ 10 | P10 |
| 50% | θ 50 | P50 |
| 55% | θ 55 | P55 |
| 60% | θ 60 | P60 |
| 65% | θ 65 | P65 |
| 70% | θ 70 | P70 |
| 75% | θ 75 | P75 |
| 80% | θ 80 | P80 |
| 85% | θ 85 | P85 |
| 90% | θ 90 | P90 |
| 95% | θ 95 | P95 |
| 100% | θ 100 | P100 |
| 105% | θ 105 | P105 |

Fig. 7

| MOTION SETTING | | | | | | | | |
|---|---|---|---|---|---|---|---|---|
| DESIGNATED PRESSURE FORCE | | | 800 kN | | PRESSURIZATION LIMIT POSITION | | 10 | mm |

| STEP | | 1 | 2 | 3 | 4 | 5 | 6 | |
|---|---|---|---|---|---|---|---|---|
| POSITIONAL CONTROL | | V1 | | | | ~V1 | | mm/s |
| SPEED CONTROL | | | V2 | V3 | | | | mm/s |
| PRESSURE-FORCE CONTROL | | | | | F4 | | | kN |
| STEP SHIFT | METHOD | P | P | F | T | P | | |
| | VALUE | PP | PM1 | 100% | 2.5 sec | PS | | |
| AUXILIARY | 1 | | | | | | | |
| | 2 | | | | | | | |
| | 3 | | | | | | | |

STEP SHIFT METHOD VALUE

P : DISTANCE FROM BDC                                                : DISTANCE (mm)

F : PRESSURE FORCE (PRESSURE-FORCE DETERMINATION DEVICE)    : % TO DESIGNATED PRESSURE FORCE

T : TIME AFTER SHIFT TO CURRENT STEP                     : TIME (SECOND)

M : MOVING DISTANCE AFTER SHIFT TO CURRENT STEP       : DISTANCE (mm)

IN : SIGNAL FROM EXTERNAL INPUT                          : INPUT CHANNEL

Fig. 9

| MOTION SETTING | | | | | | | | |
|---|---|---|---|---|---|---|---|---|
| DESIGNATED PRESSURE FORCE | | 800 | kN | PRESSURIZATION LIMIT POSITION | | 10 | mm | |
| STEP | | 1 | 2 | 3 | 4 | 5 | 6 | |
| POSITIONAL CONTROL | | V1 | | | −V1 | | | mm/s |
| SPEED CONTROL | | | V2 | V3 | | | | mm/s |
| PRESSURE-FORCE CONTROL | | | | | | | | kN |
| STEP SHIFT | METHOD | F | F | F | P | | | |
| | VALUE | 10% | 70% | 100% | PS | | | |
| AUXILIARY | 1 | | | | | | | |
| | 2 | | | | | | | |
| | 3 | | | | | | | |

STEP SHIFT METHOD                                    VALUE
   P : DISTANCE FROM BDC                        : DISTANCE (mm)
   F : PRESSURE FORCE (PRESSURE-FORCE DETERMINATION DEVICE)   : % TO DESIGNATED PRESSURE FORCE
   T : TIME AFTER SHIFT TO CURRENT STEP           : TIME (SECOND)
   M : MOVING DISTANCE AFTER SHIFT TO CURRENT STEP : DISTANCE (mm)
   IN : SIGNAL FROM EXTERNAL INPUT                : INPUT CHANNEL

*Fig. 11*

| MOTION SETTING | | | | | | | | |
|---|---|---|---|---|---|---|---|---|
| | | DESIGNATED PRESSURE FORCE | 800 | kN | PRESSURIZATION LIMIT POSITION | | 10 | mm |

| STEP | | 1 | 2 | 3 | 4 | 5 | 6 | |
|---|---|---|---|---|---|---|---|---|
| POSITIONAL CONTROL | | V1 | | | | −V1 | | mm/s |
| SPEED CONTROL | | | V2 | V3 | | | | mm/s |
| PRESSURE-FORCE CONTROL | | | | | F4 | | | kN |
| STEP SHIFT | METHOD | P | P | F | T | P | | |
| | VALUE | PP | PM1 | 100% | 2.5 sec | PS | | |
| AUXILIARY | 1 | | | | Vib | | | |
| | 2 | | | | | | | |
| | 3 | | | | | | | |

STEP SHIFT METHOD                                         VALUE
   P : DISTANCE FROM BDC                              : DISTANCE (mm)
   F : PRESSURE FORCE (PRESSURE-FORCE DETERMINATION DEVICE)  : % TO DESIGNATED PRESSURE FORCE
   T : TIME AFTER SHIFT TO CURRENT STEP                : TIME (SECOND)
   M : MOVING DISTANCE AFTER SHIFT TO CURRENT STEP     : DISTANCE (mm)
   IN : SIGNAL FROM EXTERNAL INPUT                     : INPUT CHANNEL

*Fig. 13*

| TEST OPERATION | | | | | | | | |
|---|---|---|---|---|---|---|---|---|
| | | DESIGNATED PRESSURE FORCE | 800 | kN | | PRESSURIZATION LIMIT POSITION | 10 | mm |
| STEP | | 1 | 2 | 3 | 4 | 5 | 6 | |
| POSITIONAL CONTROL | | V1 | | | | V5 | | mm/s |
| SPEED CONTROL | | | V2 | V3 | | | | mm/s |
| PRESSURE-FORCE CONTROL | | | | | F4 | | | kN |
| STEP SHIFT | METHOD | P | P | F | T | P | | |
| | VALUE | | | 100% | 2.5 sec | PS | | |
| AUXILIARY | 1 | | | | | | | |
| | 2 | | | | | | | |
| | 3 | | | | | | | |

STEP SHIFT METHOD
    P : DISTANCE FROM BDC
    F : PRESSURE FORCE (PRESSURE-FORCE DETERMINATION DEVICE)
    T : TIME AFTER SHIFT TO CURRENT STEP
    M : MOVING DISTANCE AFTER SHIFT TO CURRENT STEP
    IN : SIGNAL FROM EXTERNAL INPUT

VALUE
    : DISTANCE (mm)
    : % TO DESIGNATED PRESSURE FORCE
    : TIME (SECOND)
    : DISTANCE (mm)
    : INPUT CHANNEL

METHOD AND APPARATUS FOR CONTROLLING ELECTRIC SERVO PRESS

CROSS REFERENCE TO RELATED APPLICATIONS

The present application claims priority under 35 U.S.C. §119 to Japanese Patent Application No. 2009-277377, filed Dec. 7, 2009, which is incorporated herein by reference.

FIELD OF THE INVENTION

The present invention relates to a technology for controlling an electric servo press machine using a rotary-to-linear motion converting mechanism for converting rotary motion into linear motion through an intermediation of a decentering shaft such as a crankshaft or an eccentric shaft to convert a rotational output of a servo motor into linear motion of a slide so as to perform press working.

BACKGROUND

Press machines are roughly classified into two types: hydraulic press machines and mechanical press machines. The hydraulic press machines use a hydraulic pressure as a drive source to drive a slide. The mechanical press machines drive a driving mechanism (for example, a crank mechanism) with an electric motor to vertically move a slide connected to the driving mechanism so as to perform press working.

The hydraulic press machine (hereinafter, also referred to as "hydraulic press") is advantageous in ease in changing a stroke, and easy adjustment and retention of a pressure force. However, the hydraulic press is disadvantageous in a large energy loss due to heating and cooling and low productivity due to a low processing speed because of the use of the hydraulic pressure. On the other hand, the mechanical press machine (hereinafter, also referred to as "mechanical press") has drawbacks in terms of adjustment and retention of the pressure force. However, the mechanical press has a high processing speed, and therefore is overwhelmingly advantageous in terms of productivity. Thus, the mechanical presses are used in 95% or larger of press working for mass production.

The press working includes various types of processing such as punching, drawing, and forging. Among the various types of processing, closed-die forging, some types of squeezing, and powder molding require the precise adjustment of the pressure force. Thus, even though the mechanical press is overwhelmingly advantageous in terms of productivity, the mechanical press is not available for the aforementioned types of processing and the hydraulic press has to be used in some cases.

On the other hand, the conventional mechanical presses generally use the following mechanism. A flywheel is driven by an electric motor. A stored energy of the flywheel is used to drive an eccentric mechanism such as a crank mechanism (through an intermediation of a reducer as needed) with a turning force of the flywheel so as to vertically drive a slide connected to the eccentric mechanism. In recent years, however, an electric servo press which directly drives the eccentric mechanism such as the crank mechanism (through an intermediation of the reducer as need) by a servo motor without using the flywheel has been launched into the market and used. The use of the electric servo press expands the range of processing of the mechanical press and therefore, increases at a rapid rate because the electric servo press enables free motion to be set for the slide.

For example, Japanese Patent Application Laid-Open NO. H10-277797 describes a multi-stage motion controller using a servo press. Japanese Patent Application Laid-open NO. H10-277797 describes that an output torque of a servo motor is adjusted by controlling a driving current of the servo motor during a multi-stage motion process to obtain a pressure force of the slide according to set motion data. The multi-stage motion controller described in Japanese Patent Application Laid-Open NO. H10-277797 does not use the rotary mechanism such as the crankshaft but uses a hydraulic cylinder, a linear drive electric motor, or a power converter using a ball screw, as a slide driving mechanism so as to vertically drive the slide.

Japanese Patent Application Laid-open NO. 2003-181698 describes an electric servo press using a crankshaft. When the position of a slide reaches a press-working area, a control system, of a servo motor is switched from a positional control system to a pressure-force control system to control a pressure force of the slide. Further, the relation between a torque of the electric servo motor and the pressure force of the slide varies depending on the position of the crankshaft because of the structure of the electric servo press using the crankshaft. In view of the relation as described above, a relational expression of the torque of the servo motor and the pressure force of the slide depending on an angle of rotation of the crankshaft is used to control the output torque of the servo motor so as to obtain a set pressure force of the slide.

Further, Japanese Patent Application Laid-Open NO. 2003-154498 describes a technology of performing pressurization f or a set time period with a maximum pressure force. Japanese Patent Translation Publication NO. 2009-505834 (corresponding to a translation of WO 2007/022755) describes a technology of eliminating the effects of an increase or decrease in acceleration rate of each movable portion for the precision of the pressure force of the slide.

The linear drive electric motor (linear motor) described in Japanese Patent Application Laid-open NO. H10-277797 is capable of performing motions as those performed by the hydraulic press. On the other hand, it is difficult to obtain a large thrust in view of the structure. In addition, a coil-side unit and a permanent magnet-side unit which has a large attracting force are independent of each other. Therefore, the linear drive electric motor has difficulty in handling the permanent-magnet side unit at the time of incorporation of the permanent-magnet side unit into the press machine. Further, it is not easy either to increase the torque by using the reducer to obtain a large thrust as in the case where the rotary electric motor is used.

Similarly to the linear motor, even in the case of the power conversion mechanism using the ball screw, which is described in Japanese Patent Application Laid-Open NO. H10-277797, it is difficult to obtain a large thrust due to restrictions in view of the mechanism. The pressure force at the time of molding of a product is directly applied to the ball screw to increase a friction force. As a result, there is a fear of causing the abrasion of the ball screw. Therefore, in the actual conditions, it is difficult to employ the linear drive electric motor and the mechanism using the ball screw for a large press machine which is required to have a large pressure force.

On the other hand, the press machine using the crankshaft or the eccentric shaft is relatively easy to fabricate even though the press machine is required to have a large pressure force. Thus, a large number of press machines ranging in size from small to large are fabricated.

In Japanese Patent Application Laid-Open NO. 2003-181698, the press machine using the crankshaft is described.

The press machine described in Japanese Patent Application Laid-Open NO. 2003-181698 controls the torque of the servo motor by using the relational expression of the torque of the servo motor and the pressure force of the slide, which depends on the angle of rotation of the crankshaft. Therefore, it seems that the precise control of the pressure force can be performed.

In theory, however, the press machine using the eccentric mechanism can generate an infinite pressure force of the slide at bottom dead center (hereinafter, abbreviated as BDC). Therefore, a slight fluctuation in torque of the servo motor appears as a large change in pressure force in the vicinity of BDC.

Therefore, a method of adjusting the output torque by the control of the current of the servo motor so as to control the pressure force of the slide has a characteristic in that an error in output torque of the servo motor is amplified as the slide comes closer to BDC, which also increases an error in pressure force of the slide.

Further, in theory, the pressure force becomes infinite at BDC as described above. The effects of a frictional force of a sliding portion for driving the eccentric mechanism cannot be neglected any more. Thus, in practice, it is difficult to precisely control the pressure force only by controlling the torque of the servo motor.

If the setting is performed so that the speed is changed with a high degree of freedom, which is a characteristic of the electric servo press, in the vicinity of BDC, the effects of moment of inertia of the reducer mechanism or the crankshaft on the pressure force of the slide are generated in an amplified manner. Therefore, control accuracy is further lowered. As a result, load control scarcely functions in the vicinity of BDC.

The press using the eccentric mechanism such as the crankshaft is capable of generating a large pressure force in the vicinity of BDC. Therefore, an area of the vicinity of BDC is forced to be positively used as the press-working area. Therefore, the control has low accuracy in the most frequently used area over the stroke of the slide of the press. Accordingly, in the actual conditions, the press working with high accuracy cannot be satisfactorily realized.

SUMMARY OF THE INVENTION

The present invention has been made in view of the aforementioned actual conditions of the related art, and therefore has an object to provide an apparatus and a method for controlling an electric servo press using a rotary-to-linear motion converting mechanism having a decentering shaft, which is capable of generating a large pressure force with a simple and low-cost configuration and is also capable of controlling a pressure force of a slide with high accuracy.

Therefore, according to the present invention, a controller for an electric servo press for linearly driving a slide through an intermediation of a rotary-to-linear motion converting mechanism for rotating a decentering shaft by a rotational output of a servo motor to convert rotation of the decentering shaft into linear motion, to perform press working, includes:
- a press load sensor for detecting a pressure force of the slide;
- a pressure-force determination device for determining whether the pressure force of the slide reaches one or a plurality of different pressure-force setting values based on the one or the plurality of different pressure-force setting values and an output signal of the press load sensor, and for generating a pressure-force achievement signal each time the pressure force of the slide reaches each of the one or the plurality of different pressure-force setting values;
- a servo motor drive controller for controlling driving of the servo motor; and
- a motion command device,
  in which in respond to generation of the pressure-force achievement signal, at least one of switching of a drive control mode by the servo motor drive controller and switching of a motion to be commanded by the motion command device is performed.

In the present invention, a stroke of the electric servo press is started at a standby position or top dead center (hereinafter, abbreviated as TDC) (PS). At the start of the stroke, the servo motor drive controller controls the driving of the servo motor by positional control based on a command from the motion command device. As a result, for example, an operation starting at the standby position can be quickly performed to improve productivity.

In the present invention, the motion commanded by the motion command device is switched based on generation of a first pressure-force achievement signal so that the servo motor drive controller switches the drive control mode for the servo motor from the positional control to speed control. As a result, for example, the productivity can be improved as in the case described above.

In the present invention, the first pressure-force achievement signal is set so as to be generated at an actual processing start point at which a predetermined voltage is generated between an upper-die and a lower die. As a result, the productivity can be improved because, for example, an operation during non-processing time can be performed at a high speed.

In the present invention, the motion command device switches the motion command so that a rotating speed of the servo motor is lowered based on generation of a second pressure-force achievement signal while the servo motor drive controller is performing the positional control or the speed control on the servo motor. As a result, for example, the processing with a pressure force around a designated pressure force can be performed at a lower speed to enable processing with high accuracy.

In the present invention, the motion command device switches the motion command based on generation of a third pressure-force achievement signal so as to switch the drive control mode for the servomotor, which is performed by the servo motor drive controller, from the speed control to the torque control. As a result, for example, the pressure force can be controlled within a necessary range of stroke, and hence an efficient electric servo press can be provided.

In the present invention, the motion command device switches the motion command based on the generation of the third pressure-force achievement signal so as to switch the drive control mode for the servo motor, which is performed by the servo motor drive controller, from the positional control to the torque control. As a result, for example, the pressure force can be controlled within a necessary range or stroke as in the case described above, and hence an efficient electric servo press can be provided.

In the present invention, the torque control is performed for converting a pressure-force command value for the slide into a torque command value for the servo motor based on the relation between a torque generated by the servo motor and the pressure force of the slide with respect to a rotational angle position of the decentering shaft of the rotary-to-linear motion converting mechanism of the electric servo press and outputting the torque command value to the servo motor drive controller as a torque command value (Cit). As a result, for example, a stable pressure force can be compensated even while the slide is moving.

For the switching to the torque control according to the present invention, the torque value of the servo motor drive controller which actually controls the driving of the servo motor at the time of generation of the third pressure-force achievement signal is reflected on the torque command value (Cit) of the torque command after the switching to the torque control. As a result, for example, the pressure-force control with higher accuracy can be performed.

For the torque control according to the present invention, the pressure-force command value output from the motion command device is temporarily reduced to be lower than a preset value, increased to the original value, then reduced and increased again. By repeating the reduction and increase of the pressure-force command value, the pressure force of the slide is oscillated. As a result, stable molding can be performed for, for example, powder compaction.

In the present invention, it is determined that the processing is completed based on an output of a fourth pressure-force achievement signal. Then, the drive control mode of the servo motor drive controller is returned to the positional control so that the servo motor is reversely rotated to return the slide to the standby position or TDC (PS). As a result, for example, the pressure-force control with high accuracy can be performed.

In the present invention, when time elapsed from the switching to the torque control becomes equal to a preset time, it is determined that the processing is completed. Then, the drive control mode for the servomotor drive controller is returned to the positional control so that the servo motor is reversely rotated to return the slide to the standby position or TDC (PS). As a result, for example, stable molding can be performed.

In the present invention, when a moving distance of the slide after the switching to the torque control becomes equal to a preset distance, it is determined that the processing is completed. Then, the drive control mode for the servo motor drive controller is returned to the positional control so that the servo motor is reversely rotated to return the slide to the standby position or TDC (PS). As a result, for example, the stable molding can be performed as in the case described above.

In the present invention, if the amount of energy stored in an energy storage device functioning as a drive source of the servo motor is equal to or smaller than a specified amount when the servo motor drive controller switches the drive control mode or the motion command device switches the motion to be commanded, the driving of the servo motor is temporarily stopped. When the amount of stored energy is increased to the specified value again, the driving of the servo motor is restarted. As a result, for example, processing requiring larger processing energy can be performed, which further expands the range of use of the electric servo press.

In the present invention, the electric servo press is configured so as to be able to operate in a test operation mode in which the electric servo press is operated while the slide is operated at a speed lower than a normal production speed. In addition, a plurality of different pressure-force setting values are set for the pressure-force determination device. A storage device for storing a corresponding slide position in association with the pressure-force setting value when the pressure force reaches each of the pressure-force setting values is provided. In this manner, the electric servo press is operated in the test operation mode so that each of the slide positions is stored in the storage device. Based on the stored slide positions, at least one parameter relating to the motion commanded by the motion command device is automatically determined. As a result, for example, operability is further improved because the parameter can be automatically determined.

In the present invention, the electric servo press is configured so as to be able to operate in the test operation mode in which the electric servo press is operated while the slide is operated at the speed lower than the normal production speed. In addition, a plurality of different pressure-force setting values are set for the pressure-force determination device. The storage device for storing a corresponding slide position in association with the pressure-force setting value when the pressure force reaches each of the pressure-force setting values. In this manner, the electric servo press is operated in the test operation mode so that each of the slide positions is stored in the storage device. Based on the stored slide positions, it is determined whether or not the adjustment of the slide position (die-height adjustment) with respect to the rotational angle position of the crankshaft is required. As a result, the electric servo press of the present invention can be properly used in a simple manner.

Further, according to the present invention, a method for controlling an electric servo press for linearly driving a slide through an intermediation of a rotary-to-linear motion converting mechanism for rotating a decentering shaft by a rotational output of a servo motor to convert rotation of the decentering shaft into linear motion, to perform press working according to the present invention, includes:
  detecting a pressure force of the slide;
  determining whether the pressure force of the slide reaches one or a plurality of different pressure-force setting values based on the one or the plurality of different pressure-force setting values and a detection value of the pressure force of the slide and generating a pressure-force achievement signal each time the pressure force of the slide reaches each of the one or the plurality of different pressure-force setting values; and
  performing at leas one of switching of a drive control mode of a servo motor drive controller for controlling driving of the servo motor and switching of a motion commanded by a motion command device for commanding a control motion in respond to generation of the pressure-force achievement signal.

The present invention can provide an apparatus and a method for controlling an electric servo press using a rotary-to-linear motion converting mechanism having a decentering shaft, which is capable of generating a large pressure force with a simple and low-cost configuration and is also capable of controlling a pressure force or a slide with high accuracy.

BRIEF DESCRIPTION OF THE DRAWINGS

FIG. 5 is a table showing an example of a storage area (storage table) provided in the press controller (motion setting information storage section) of the electric servo press according to the embodiment of the present invention;

FIG. 7 is a view illustrating an example of a motion setting screen displayed on a display provided to an operating section (information input section) of the press controller of the electric servo press according to the embodiment of the present invention;

FIG. 9 is a view illustrating another example of the motion setting screen according to the embodiment of the present invention;

FIG. 11 is a view illustrating a further example of the motion setting screen according to the embodiment of the present invention;

FIG. 13 is a view illustrating an example of the motion setting screen according to the embodiment of the present invention when a test operation is performed;

DETAILED DESCRIPTION

Figure 1:
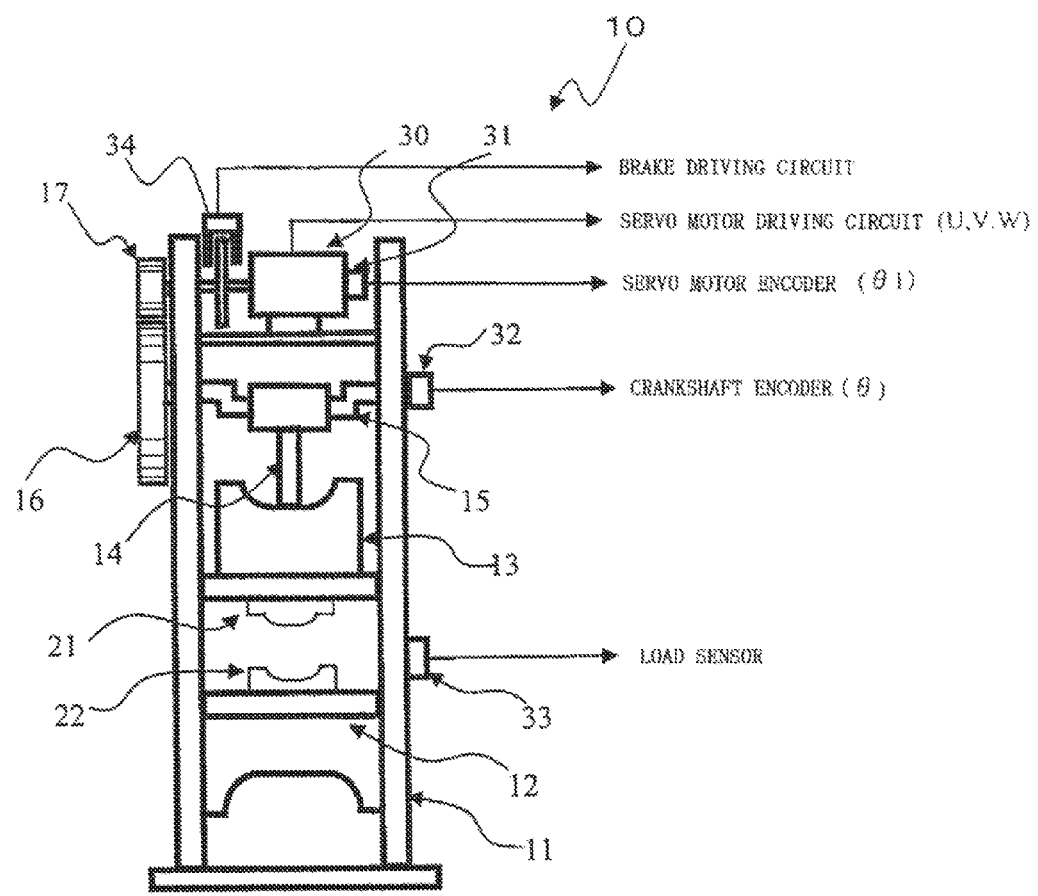
FIG. 1 is a front view schematically illustrating an example of an electric servo press according to an embodiment of the present invention.

Hereinafter, an embodiment of the present invention is described referring to the accompanying drawings. The present invention is not limited by the embodiment described below.

An electric servo press 10 according to this embodiment is configured as illustrated in FIGS. 1 to 15. A servo motor 30 drives a crankshaft 15 through an intermediation of a drive gear 17 and a main gear 16. The crankshaft 15 is configured to have an eccentric mechanism for vertically driving a slide 13 through an intermediation of a connecting rod 14. The servo motor 30 is configured to be driven so that the rotation thereof can be controlled to be reversed, and therefore can start driving the slide 13 vertically at an arbitrary position.

A representative operation of this embodiment is generally described.

Figure 8:
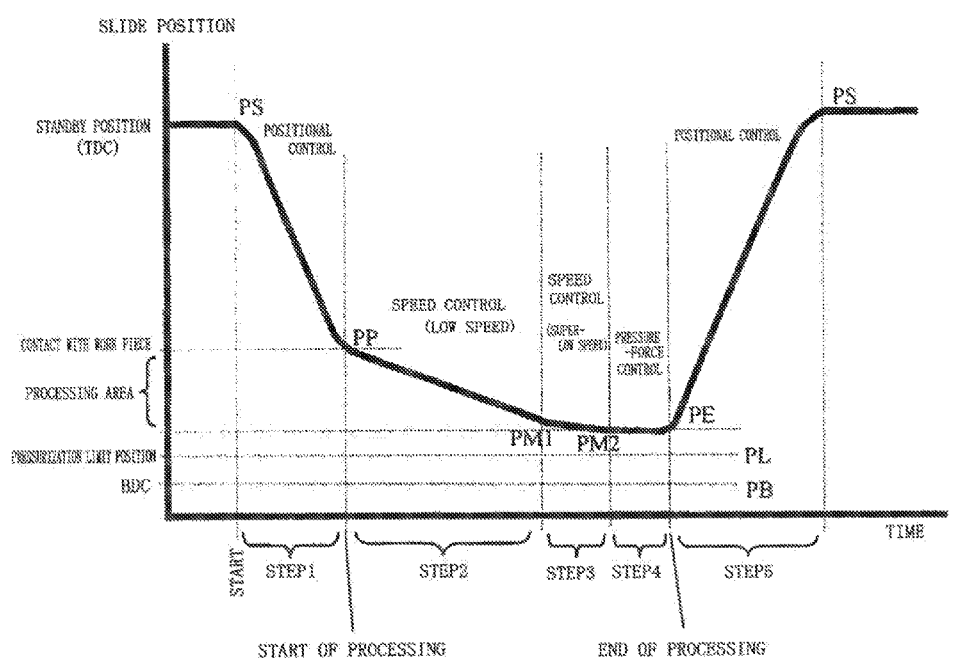
FIG. 8 is a timing chart with the horizontal axis representing time, which shows a state where the slide operates according to the contents set on the motion setting screen shown in FIG. 7.

For example, as illustrated in FIG. 8, the servo motor 30 is controlled under positional control to be driven to rotate forward so as to lower the slide 13 from a standby position (top dead center; hereinafter, abbreviated as TDC) PS to a processing start position (PP). At the processing start position (PP), a drive control mode is switched from the positional control to speed control. The servo motor 30 is controlled under the speed control to be driven to rotate forward so as to lower the slide 13 to a first processing intermediate position (PM1).

After that, the speed is switched to a further lower speed at the first processing intermediate position (PM1), and the speed control is continued. When a pressure-force determination device 60 determines that the pressure force of the slide 13 has reached a preset pressure force while the slide 13 is being lowered, the position at which the pressure force of the slide 13 reaches the preset pressure force is determined as a second processing intermediate position (PM2). Then, the drive control mode is immediately switched from the speed control to torque control. At the same time, the servo motor 30 is controlled under the torque control so that the pressure force of the slide 13 becomes equal to the pressure force obtained at the time when the pressure-force determination device 60 determines the second processing intermediate position (PM2).

Further, after the elapse of a preset time period from the time of determination of the second processing intermediate position (PM2), it is determined that the processing is completed. Then, the drive control mode is switched from the torque control to the positional control to control to drive the servo motor 30 to rotate reversely. In this manner, the slide 13 is controlled to be raised and return to the initial standby position (PS).

The pressure-force determination device 60 obtains the pressure force of the slide 13 based on a load signal from a load sensor 33 mounted to a frame 11 of the electric servo press 10. Therefore, the control can be performed with a precise pressure force without being affected by the position of the crankshaft, as happens in the case of a value obtained from a torque of a drive motor.

The description is given further in details. FIG. 1 is a front view of a principal part of an example of the electric servo press.

A bolster 12 is mounted to the frame 11 of a main body of the electric servo press 10. Above the bolster 12, the slide 13 is provided inside the frame 11 so as to be vertically movable. Above the slide 13, the crankshaft 15 is rotatably provided to the frame 11. The connecting rod 14 is rotatably mounted to a central eccentric portion (crank arm) of the crankshaft 15, and a lower part of the connecting rod 14 is connected to the slide 13. In this manner, the slide 13 is vertically driven by the rotation of the crankshaft 15. Although not illustrated, a weight-balance device is engaged with the slide 13 so as to stably drive the slide 13. Although not illustrated either, there is further provided an adjustment (die-height adjustment) mechanism for adjusting the position of the slide 13 with respect to a rotational angle position of the crankshaft 15 to align the position of the slide with a height of dies mounted between the bolster 12 and the slide 13, that is, for the adjustment of the position of the slide 13.

The main gear 16 is mounted to an end of the crankshaft 15. Further, the servo motor 30 is mounted to an upper part of the frame 11. The drive gear 17 for driving the main gear 16 is mounted to an output rotary shaft of the servo motor 30. Further, a mechanical brake 34 is mounted to the output shaft of the servo motor 30. The mechanical brake 34 can reliably stop the slide 13 in the case where the servo motor 30 is not driven or in case of emergency due to a failure or the like. In this manner, safety is ensured.

When the mechanical brake 34 is released to drive the output rotary shaft of the servo motor 30 by the mechanism described above, a torque is increased while the speed of rotation of the servo motor 30 is reduced by the drive gear 17 and the main gear 16, thereby rotating the crankshaft 15. In this manner, the slide 13 is vertically driven. With the aforementioned mechanism, an upper die 21 mounted to the slide 13 is vertically moved relative to a lower die 22 mounted to the bolster 12 to enable the press molding.

Although a single-stage reduction mechanism constituted by the drive gear 17 and the main gear 16 is used in FIG. 1, a two-stage reduction mechanism including another set of gears (reducers) may be used. Alternatively, the crankshaft 15 can be directly driven by the servo motor 30 without using the reduction mechanism.

A servo motor encoder 31 for detecting a rotation angle of the servo motor 30 is mounted on the side of the servo motor 30, which is opposite to the output rotary shaft so as to be coaxial with the output rotary shaft. A rotation angle 91 corresponding to an output of the servo motor encoder 31 is input to a servo motor drive controller 50. Any of an AC servo motor and a DC servo motor can be used as the servo motor 30.

A crankshaft encoder 32 for detecting a rotation angle of the crankshaft 15 is mounted to an end of the crankshaft 15, which is opposite to the main gear 16 side. A rotation angle 9 corresponding to an output of the crankshaft encoder 32 is input to a press controller 40. The crankshaft encoder 32 and the slide 13 are connected by the connecting rod 14. Therefore, the position of the slide 13 can be obtained from the output 9 of the crankshaft encoder 32. Although not illustrated, however, a linear sensor such as a linear scale can be mounted between the bolster 12 and the slide 13 so as to directly detect a distance between the slide 13 and the bolster 12. In this embodiment, the position of the slide 13 is detected from the rotational angle position 9 of the crankshaft 15 by the crankshaft encoder 32 alone.

Figure 2:
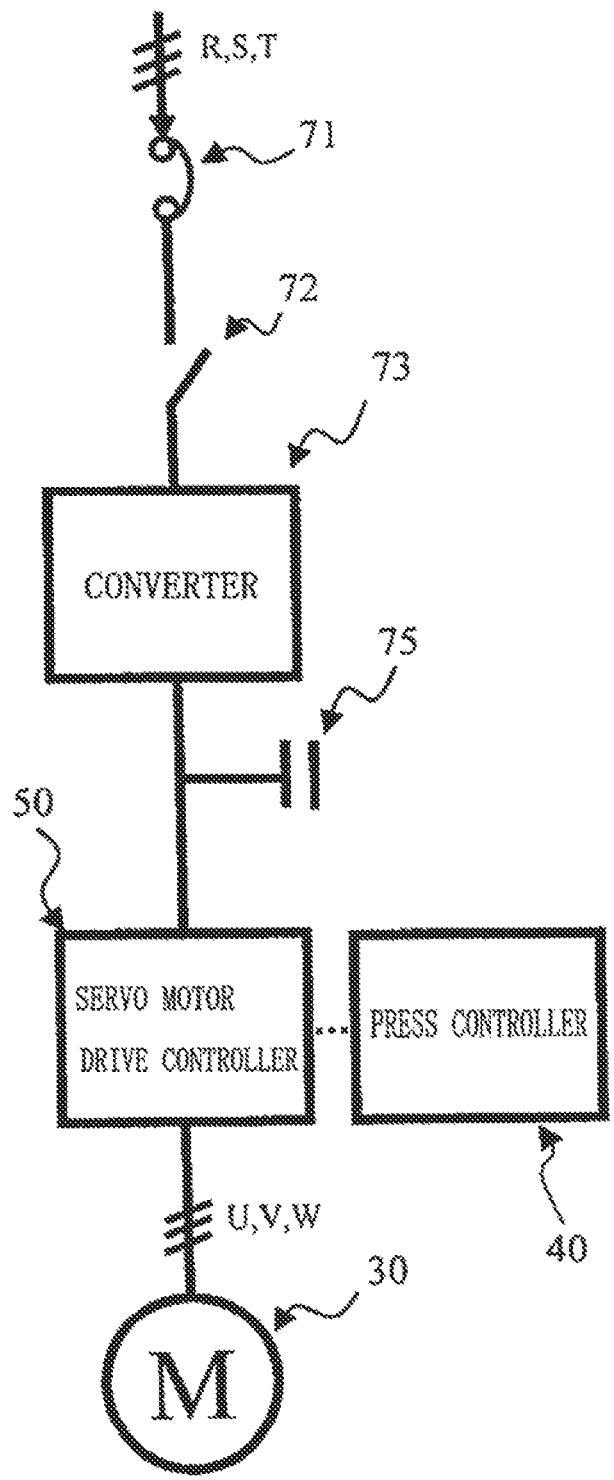
FIG. 2 is a view schematically illustrating an example of an electric system diagram (one-line diagram) of the electric servo press according to the embodiment of the present invention.

FIG. 2 illustrates an example of an electric system diagram (single-line connection diagram) of the electric servo press 10.

Three-phase AC power (R, S, and T) is received by an overcurrent breaker 71 and is then supplied to a converter 73 through an intermediation of an electromagnetic contactor 72. Although not illustrated, when a servo power-ON operation is performed on the electric servo press 10, the electric contactor 72 is closed to supply the three-phase AC power to the converter 73. The converter 73 converts the three-phase AC power into DC power which is then stored in an energy storage device 75. In the embodiment, an energy storage capacitor is used as the energy storage device 75.

The servo motor drive controller 50 generates the three-phase AC power which has been subjected to current control based on pulse width modulation (PWM) control from the DC power and then supplies the thus generated three-phase AC power to the servo motor 30 so as to perform rotary drive control on the servo motor 30.

Moreover, the press controller 40 is connected to the servo motor drive controller 50 so that various control signals are transmitted and received therebetween. In this manner, the driving of the servo motor 30 is controlled.

Figure 3:
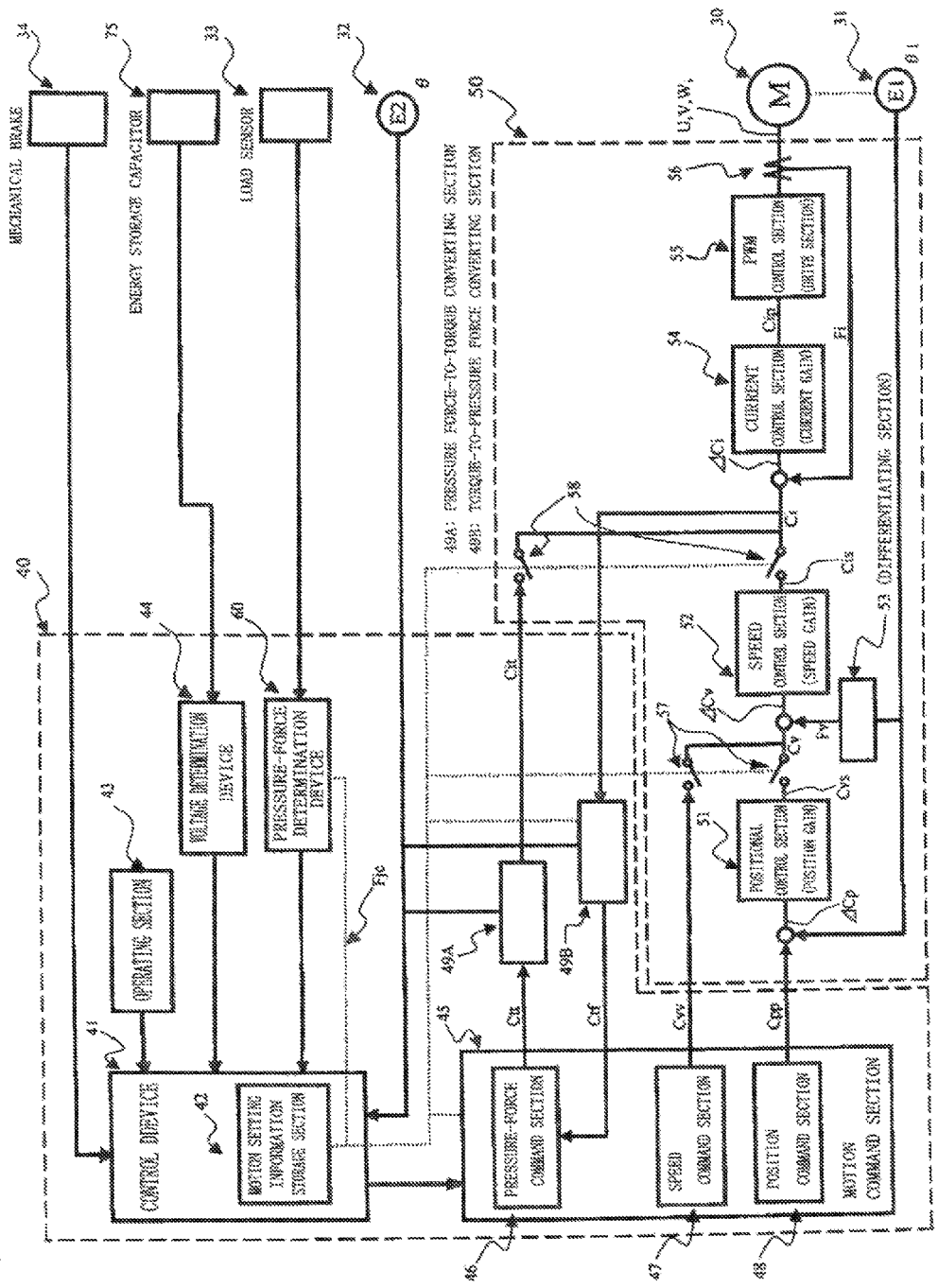
FIG. 3 is a block diagram for illustrating a configuration of a control system (such as a press controller including a motion command device and a servo motor drive controller) of the electric servo press according to the embodiment of the present invention.

More specifically, as illustrated in FIG. 3, a motion command device 45 is provided to the press controller 40. The motion command device 45 transmits motion commands (specifically, a position command, a speed command, and a torque command) to the servo motor drive controller 50. According to the motion command, the servo motor drive controller 50 controls the driving of the servo motor 30.

The control on the driving of the servo motor 30, which is performed by the press controller 40 and the servo motor drive controller 50, is described in detail referring to FIG. 3.

The press controller 40 includes a press control device (hereinafter, also referred to simply as "control device") 41, an operating section 43, the pressure-force determination device 60, a voltage determination device 44, the motion command device 45, and a pressure force-to-torque converting section 49A and a torque-to-pressure force converting section 49B. In the control device 41, slide adjustment and control of a die-clamping device or a material feeder, which are not directly related to the driving of the servo motor 30 and the slide 13, are performed. However, the description thereof is herein omitted.

The operating section 43 is connected to the control device 41. Various operations and setting of the electric servo press 10 and setting of motion data relating to the driving of the slide 13 are performed in the operating section 43 and are then transmitted to the control device 41. More specifically, various types of data for generating the motion commands in the motion command device 45 and data relating to a pressure-force setting value for the pressure-force determination device 60 are input from the operating section 43 to be stored in a motion setting information storage section 42 provided in the control device 41. An example of basic motion setting for generating the motion command is illustrated in FIGS. 7, 9, 11, and 13, and the details thereof are described later.

The load sensor 33 is mounted to the frame 11 of the electric servo press 10. An output of the load sensor 33 is input to the pressure-force determination device 60. The load sensor 33 detects the extension of the frame 11, which is caused, by the pressure force of the slide 13, to measure the pressure force of the slide 13. In place of the load sensor 33, for example, a sensor for measuring a pressure of a hydraulic chamber, which is provided to the slide 13, can be used. Alternatively, a load output of a separately mounted load meter may be used. Specifically, any configuration may be used as long as an output or a value which allows a correct measurement of a generated load (pressure force) of the electric servo press 10 is input to the pressure-force determination device 60.

The pressure-force determination device 60 is connected to the control device 41. Preset designated pressure force and pressure-force setting value are stored in the motion setting storage section 42. The pressure-force determination device 60 compares the pressure-force setting value and an actual pressure force of the slide 13, which is obtained by the load sensor 33, with each other. When the pressure-force setting value and the actual pressure force are equal to each other, the pressure-force determination device 60 outputs a pressure-force achievement signal to the control device 41 and the servo motor drive controller 50.

A detection signal of the crankshaft encoder 32 for detecting the rotation angle of the crankshaft 15 is input to the control device 41. In a test operation in which the slide 13 is driven at a low speed, the pressure-force determination device 60 compares a plurality of the pressure-force setting values and the pressure force of the slide 13 with each other and then outputs the pressure-force achievement signal for each comparison. The details of the test operation are described below. The control device 41 stores in the motion setting information storage section 42 a crank angle position when each of the pressure-force achievement signals is output and the position of the slide (position above bottom dead center (hereinafter, abbreviated as BDC) in the embodiment; hereinafter, also referred to simply as "slide position") obtained from the crank angle position.

The motion command device 45 includes a position command section 48, a speed command section 47, and a pressure-force command section 46. By using the information of the motion information storage section 42, the position command section 48 generates a position command, the speed command section 47 generates a speed command, and the pressure-force command section 46 generates a pressure-force command. The motion command device 45 selects any one of the position command, the speed command, and the pressure-force command according to the drive control mode determined in the control device 41 based on the pressure-force achievement signal from the pressure-force determination device 60, and then outputs the selected command to the servo motor drive controller 50.

For the generation of the motion command in the motion command device 45, various methods are devised and used actually, such as a method for specifying the speed or the pressure force for each arbitrary interval, a method for representing the motion command as a motion curve with a momentarily changing speed, and so-called S-curve processing for reducing an impact at an inflection point such as a start point or a stop point. This embodiment employs a method using the S-curve processing as needed while basically using the command to achieve a constant speed or pressure force over an arbitrary interval, and therefore the description of the other methods is herein omitted. However, the method for generating the motion command is not limited to the aforementioned method.

The press controller 40 includes the pressure force-to-torque converting section 49A and the torque-to-pressure force converting section 49B corresponding to an inverse conversion section for the pressure force-to-torque converting section 49A.

Figure 6:
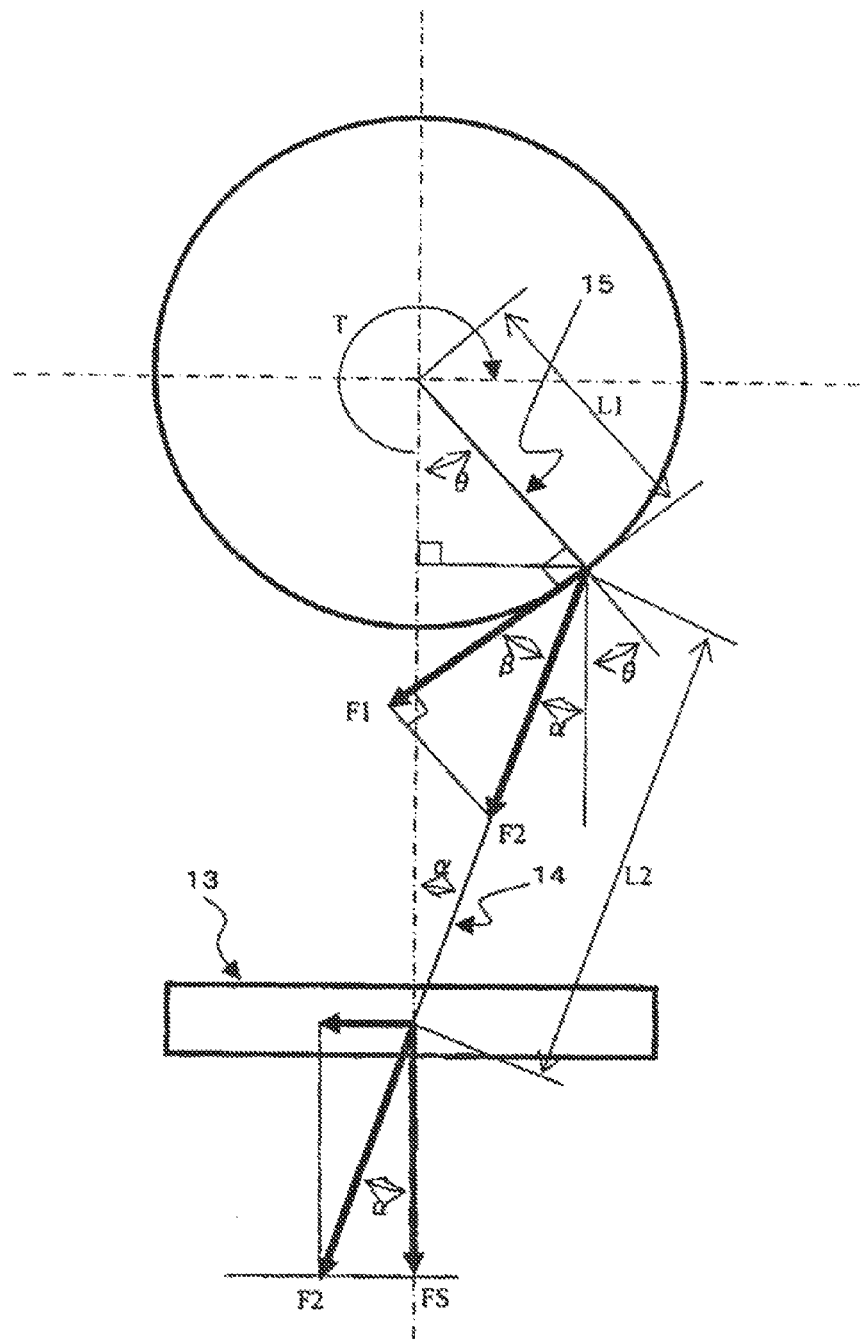
FIG. 6 is a view for illustrating the relation between a torque T of a crankshaft and a pressure force FS of the slide.

Now, the relation between a torque T of the crankshaft 15 and a pressure force FS of the slide 13 is described referring to FIG. 6. In FIG. 6, it is assumed that the torque of the crankshaft 15 is T, a radius of the crank arm is L1, a length of the connecting rod 14 is L2, a force in a crank rotating direction is F1, a force in an axial direction of the connecting rod 14 is F2, a pressure force of the slide 13 is FS, an angle between F2 and FS is α, and an angle between F1 and F2 is β. Then, $$FS = \frac{1}{\sin\theta + L2/L1 \cdot \sin\theta\cos\theta/\sqrt{\{1-(L1/L2\cdot\sin\theta)^2\}}} \cdot \frac{1}{L1} \cdot T \quad \text{Formula 1}$$

is established. Therefore, from the torque T of the crankshaft 15 and the position (angle of rotation) θ of the crankshaft 15, the pressure force FS of the slide 13 is obtained.

In addition, $$T=[\sin\theta+L2/L1\cdot\sin\theta\cos\theta/\sqrt{\{1-(L1/L2\cdot\sin\theta)^2\}}]\cdot L1\cdot FS \quad \text{Formula 2}$$

is established. Therefore, the torque T of the crankshaft 15 is obtained from the pressure force FS of the slide 13 and the position (angle of rotation) θ of the crankshaft 15.

The radius L1 of the crank arm and the length L2 of the connecting rod 14 are determined as values specific to the electric servo press 10. Similarly, a reduction ratio obtained by the main gear 16 and the drive gear 17 is determined as a value specific to the electric servo press 10.

Further, as illustrated in FIG. 3, the position 6 corresponding to the output of the crankshaft encoder 32 is input to the pressure force-to-torque converting section 49A and the torque-to-pressure force converting section 49B. Therefore, the pressure force-to-torque converting section 49A uses Formula 2 to convert a pressure-force command value Ctt of the slide 13, which is output from the pressure-force command section 46, into a torque command value Cit of the servo motor 30 at the current position θ of the crankshaft 15, and then outputs the torque command value Cit.

The torque-to-pressure force converting section 49B uses Formula 1 to convert a torque command value Ci of the servo motor 30 controlled by the servo motor drive controller 50 into a slide pressure force value Ctf at the current position θ of the crankshaft 15, and then feeds back the slide pressure force value Ctf to the pressure-force command section 46.

An example of a configuration of the servo motor drive controller 50 is illustrated in FIG. 3. The servo motor drive controller 50 mainly includes a positional control section 51, a speed control section 52, a current control section 54, and a PWM control section 55.

By comparing a position command Cpp from the position command section 48 and a position signal θ1 from the servo motor encoder 31, a difference ΔCp between the position command Cpp and the position signal θ1 is obtained. The difference ΔCp is multiplied by a position loop gain to obtain a speed command Cvs. Specifically, when the position of the servo motor 30 (output θ1 of the servo motor encoder 31) is delayed with respect to the position command, the difference ΔCp becomes large. As a result, the speed command Cvs is increased to increase the speed of the servo motor 30. The aforementioned loop is referred to as a position loop.

The speed command Cvs passes through one of switches 57 to become a speed command Cv. The speed command Cv is then compared with a speed signal Fv of the servo motor 30, which is obtained by differentiating the position signal θ output from the servo motor encoder 31 in a differentiating section 53. As a result of the comparison, a difference ΔCv therebetween is obtained. The difference ΔCv is multiplied by a speed loop gain to obtain a speed command Cis. Specifically, when the speed of the servo motor 30 is slow with respect to the speed command, the difference ΔCv becomes large. As a result, the torque command Cis is increased to increase the torque of the servo motor 30. The aforementioned loop is referred to as a speed loop.

The torque command Cis passes through one of switches 58 to become a torque command Ci which is then compared with a current feedback signal Fi output from a current detector 56 for the servo motor 30. As a result of the comparison, a difference ΔCi therebetween is obtained. The difference ΔCi is multiplied by a current loop gain to obtain a current command Cip. Specifically, when the current of the servo motor 30 is small with respect to the torque command, the difference ΔCi becomes large. As a result, the current command Cip is increased to increase the current of the servo motor 30 so as to increase the torque. The aforementioned loop is referred to as a current loop (or torque loop). The current of the servo motor 30 and the output torque have a proportional relation in the range of general use. Therefore, the torque command replaces the current command.

The PWM control section 55 receiving the input of the current command Cip performs PWM drive control on a power transistor (not shown) with the DC power stored in the energy storage capacitor 75. As a result, the three-phase AC current according to the current command Cip is obtained and is then output to the servo motor 30 so as to drive the servo motor 30.

The basic control on the servo motor 30 has the three feedback loops described above, that is, the position loop, the speed loop, and the current loop. Besides, there are various types of control such as modern control theory. The description thereof is herein omitted because various documents are available for the other types of control described above. However, the aforementioned other types of control are not prevented from being added to the present invention.

The servo motor drive controller 50 includes the switches 57 so that the servo motor 30 can be driven by a speed command Cvv from the speed command section 47 of the motion command device 45 independently of the speed command Cvs in the position loop. The servo motor drive controller 50 further includes the switches 58 so that the servo motor 30 can be driven by the torque command Cit based on the pressure-force command section 46 of the motion command device 45 independently of the torque command Cis in the speed loop. By turning ON/OFF the switches 57 and 58, the drive control mode of the servo motor drive controller 50 can be switched between the positional control, the speed control, and the torque control. More specifically, the positional control according to the command Cpp from the position command section 48 can be switched to the speed control according to the command Cvv from the speed command section 47 by turning ON/OFF the switches 57. Then, the speed control can be switched to the torque control according to the torque command Cit calculated from the command Ctt from the pressure-force command section 46 by turning ON/OFF the switches 58.

The press controller 40 includes the voltage determination device 44. A voltage between a positive electrode and a negative electrode of the capacitor 75 serving as the energy storage device is input to the voltage determination device 44 so as to be monitored. As voltages used for monitoring, a specified voltage 1 and a specified voltage 2 are provided. When the voltage between the positive electrode and the negative electrode becomes equal to or lower than the specified voltage 1, a voltage drop signal is output to the control device 41. On the other hand, when the voltage becomes equal to or higher than the specified voltage 2, a voltage rise signal is output to the control device 41.

Operation Example 1

An operation example 1 of the electric servo press according to the present invention is described.

FIG. 7 illustrates a motion setting screen of a display provided to the operating section 43. In an upper part of the screen, an area for setting a designated pressure force Fm and a pressurization limit position is provided. The designated pressure force Fm is a maximum load in the processing. Specifically, a pressure force which reliably enables molding into a final shape is set as the designated pre s sure force Fm. As the pressurization limit position, the position at which the slide cannot be lowered any more in view of the structure of the dies is set. By properly setting the pressurization limit position, the dies can be prevented from being broken due to an erroneous operation or the like.

In the table on the motion setting screen illustrated in FIG. 7, data relating to the motion of the slide for each step is further set. On the screen, the data can be set for Steps 1 to 6. In each step, data can be entered in any of [position], [speed] and [pressure force] fields. The type of control corresponding to the field in which the data is entered, that is, if data is entered in [position] field, the positional control, if data is entered in [speed] field, the speed control, and if data is entered in [pressure force] field, the pressure-force control is performed.

In [Step] [0077] of FIG. 7, [V1] is set in [position] field. Therefore, in Step 1, the servo motor drive controller 50 performs the positional control to lower the slide 13 at the speed [V1]. The speed is to be set even for the positional control. In practice, the sequential output of the position commands is started at the set speed in respond to activation so that the slide 13 is controlled to follow the commanded positions. Although the positional control described above seems to be the same as the speed control, precise positioning can be performed only by the positional control when the slide 13 is to be stopped at a predetermined position.

For each step, [method] and [value] of [step shift] are to be input. For Step 1, a step [P] and a value [PP] are input. As described in a symbol explanation section in the lower part of FIG. 7, this means, when [P: distance from BDC] reaches the position [PP], Step 1 is terminated and the processing proceeds to Step 2, By the step shift, the contents described in a [Step 1] field of the motion setting are next carried out to perform controlled driving. In FIG. 7, the data is input up to Step 5. When Step 5 is completed, the slide 13 returns to the standby position PS. In this manner, one working stroke (one processing cycle) is terminated.

FIG. 8 shows an operation of the slide 13 set on the screen illustrated in FIG. 7. Although not illustrated, when a start button of the electric servo press 10 is pressed, the servo motor drive controller 50 starts driving the servo motor 30 under the positional control to lower the slide 13 from the standby position PS to the height above BDC [PP] at the speed [V1]. Normally, the position at the height above BDC [PP] is a processing start point of the molding performed with the dies (upper die 21 and lower die 22). By setting the speed [V1] high so that the slide 13 is lowered at a high speed to the processing start point, time required for one working stroke corresponding to the entire processing cycle performed by the slide 13 is reduced.

When the slide 13 reaches the processing start point [PP], Step 2 is started to turn the switches 57 of the servo motor drive controller 50 to the speed control section 47 side of the motion command device 45. In this fashion, the drive control mode is switched from the positional control to the speed control to drive the slide 13 at a speed [V2]. The speed [V2] is set to a processing speed of the dies. Therefore, a maximum speed which allows the processing is set while an actual processing state is observed, and hence the setting for improving productivity is performed.

When the position of the slide 13 reaches the height above BDC [PM1], Step 2 is terminated and Step 3 is started. In Step 3, the servo motor drive controller 50 continues the speed control. However, the speed command from the speed command section 47 is changed to [V3] so that the slide 13 is driven at the speed [V3]. Generally, the position at the height above BDC [PM1] is a position immediately before the completion of processing. As the speed [V3], a super-low speed, which is little affected by inertia of the slide 13 or the dies (for example, the upper die 21) and allows an immediate shift to the next step, is set.

In the motion setting illustrated in FIG. 7, [method] and [value] for [step shift] in Step 3 are respectively set to [F] and [100%]. This means, when [F: pressure force] becomes equal to [100%] of the designated pressure force Fm, the shift to the next step is carried out. As the designated pressure force Fm, 800 kN is set. Therefore, when the pressure force becomes equal to 100% of the designated pressure force Fm, that is, becomes equal to 800 kN, Step 3 is terminated and the processing proceeds to Step 4.

Thus, 800 kN, that is, the designated pressure force Fm is directly set as the pressure-force setting value in the pressure-force determination device 60 illustrated in FIG. 3. When the pressure force of the slide 13 reaches 800 kN, a third pressure-force achievement signal is output so that the control is switched to the control set for Step 4. At this time, the speed [V3] for Step 3 is set to the super-low speed. Therefore, when the pressure force becomes 100%, the processing can immediately proceed to the next step. As a result, overshoot of the pressure force due to an inertia force can be prevented from occurring.

In the motion setting shown in FIG. 7, the pressure force [F4] is set in [pressure force] field for Step 4. In the pressure-force determination device 60, pressure-force setting value Fr (800 kN)=designated pressure force Fm (800 kN)×(100%) is set. When the third pressure-force achievement signal is output based on the pressure-force setting value described above, the torque command value Ci controlled by the servo motor drive controller 50 is converted into the pressure force of the slide 13 at the angular position θ of the crankshaft 15 by using the relation expressed by Formula 1 described above at that time, specifically, at the time when the pressure force of the slide 13 becomes equal to the pressure-force setting value Fr. The pressure force of the slide 13, which is obtained by the conversion, is input to the pressure-force command section 46 as a pressure-force feedback value Ctf. Immediately after that, the servo motor drive controller 50 uses the switches 58 to switch the drive control mode to the torque control. On the other hand, the pressure-force command section 46 compares the pressure-force feedback value Ctf and the pressure-force setting value Fr corresponding to the pressure force actually acting at that time with each other to calculate an error therebetween. The error is cancelled out by the pressure-force command value F4 which is to be set in Step 4. In this manner, the pressure-force command value Ctt is obtained and output. The pressure-force command value Ctt is converted into a servo motor torque at the angular position θ of the crankshaft 15, which is obtained at that time, by the pressure force-to-torque converting section 49A. Therefore, even if the slide 13 moves, the servo motor is controlled by the precise torque command. More specifically, from the pressure force Fr (because the pressure force is equal to the pressure-force setting value Fr of the pressure-force determination device 60) which actually acts immediately before the switching of the drive control mode, the pressure-force feedback value Ctf, and the designated pressure force Fm, the pressure-force command value Ctt is obtained as:

$$Ctt = \frac{Ctf}{Fr} \cdot F4 \qquad \text{Formula 3}$$

After the drive control mode is switched to the torque control, the pressure-force command value Ctt is output from the pressure-force command section 46.

In general, the shift to the next step is performed when the pressure force becomes equal to 100% of the designated pressure force Fm, and the pressure-force setting value [F4] for Step 4 is set equal to the designated pressure force Fm in many cases. Therefore, in such a case, the pressure force without any error, which is used immediately before the shift to Step 4, is continuously used even after the shift to Step 4.

Specifically, in the example of setting illustrated in FIG. 7, [F4] is set to 800 kN. At the time of output of the third pressure-force achievement signal, it is apparent that the pressure force Fr is 800 kN. Therefore, Ctt=Ctf is established. Accordingly, the value of Ctf is output as the pressure-force command value Ctt. At the time of the step shift to the next step, the same angular position θ of the crankshaft 15 is input to both the pressure force-to-torque converting section 49A and the torque-to-pressure force converting section 49B. Thus, the pressure-force command value Cit (=Cft) is inversely converted into the torque. The operation is performed so that the same torque as that obtained when the pressure-force determination device 60 detects 800 kN is output even after the shift to the next step.

Accordingly, in the vicinity of the position PM2 at which the shift from Step 3 to Step 4 is made, the precise pressure-force control can be continued even if the slide 13 is positioned near BDC.

As described above, the torque command value Ci is used as the value for feeding back the torque of the servo motor immediately before the shift to the next step in this embodiment. However, the actually output torque value (current value) Fi may be used as the value for feeding back the torque of the servo motor. In general, the servo motor is driven at the super-low speed at the time of the shift from Step 3 to Step 4. However, when the speed is high, the use of the actually output torque value (current value) Fi provides higher precision in some cases.

In the motion setting illustrated in FIG. 7, [method] and [value] of [step shift] in Step 4 are respectively set to [t] and [2.5 seconds]. Therefore, after Step 4 is started, the pressure-force control is continued for 2.5 seconds. This operation is a so-called "restriking" operation. After the elapse of 2.5 seconds from the shift to Step 4 according to the setting, Step 4 is terminated and the processing proceeds to Step 5.

In Step 5, the speed [−V1] is filled in [positional control] field. Therefore, the servo motor drive controller 50 turns the switches 57 to the position loop side to perform the positional control. The servo motor 30 is driven to be reversely rotated at the speed [−V1] to raise the slide 13. The sign [−] in the speed [−V1] means reverse rotation. The slide 13 is returned to the standby position by the reverse rotation of the servo motor 30. Therefore, because a value indicating a high speed is generally set as in the case of Step 1, [−V1] indicating the same speed and the reverse direction of rotation is set. Moreover, [method] and [value] of [step shift] are respectively set to [P] and [PS]. Therefore, after the slide 13 is returned to the standby position PS and is stopped there, Step 5 is terminated. After the termination of Step 5, one processing stroke corresponding to the entire cycle is completed because no data is filled in for Step 6.

As described above, in the operation example 1, the servo motor 30 is driven under the positional control or the speed control up to immediately before the completion of processing. In the vicinity of the completion of the processing where the pressure force becomes close to the designated pressure force Fm, the slide 13 is driven at the super-low speed. Then, the control is readily switched by the pressure-force achievement signal of the pressure-force determination device 60 based on the signal of the load sensor 33 mounted to the press frame 11, which does not contain an error increasing as the slide 13 comes closer to BDC. Therefore, the precise pressure force is obtained.

Even on the subsequent torque control of the servo motor 30, the torque command value at the time of output of the pressure-force achievement signal can be reflected. Thus, even when the slide 13 is at the position close to BDC, the precise pressure-force control can be performed around the time of output of the pressure-force achievement signal (PM2 in FIG. 8).

In the servo motor drive controller 50, the current is used as the feedback signal Fi as the torque feedback of the servo motor 30 so as to be compared with the torque command value Ci. The current is increased or decreased according to the error between the feedback signal Fi and the torque command value Ci to perform the control.

Here, a method for converting the signal of the load sensor 33 in place of the current feedback signal Fi into the torque value of the servo motor 30 and then using the obtained torque value as torque feedback is conceived. This method is based on so-called full-closed control for directly feeding back the pressure force corresponding to a final control target to the control on the servo motor 30.

However, the electric servo press machine combined with a crank mechanism or the like cannot be used in the vicinity of BDC (the press working cannot be substantially performed in the vicinity of BDC) because the torque of the motor is amplified to a theoretically infinite pressure force in the vicinity of BDC, which in turn increases the error, or because the relation between the pressure force and the torque is reversed after the slide reaches BDC and starts ascending. Therefore, the output rotary shaft of the servo motor, which is generally used as a conventional electric servo press, unidirectionally rotates, specifically, the processing operation after the slide reaches BDC cannot be performed. Moreover, the characteristics of the electric servo press are greatly impaired; for example, the switching to the positional control or the speed control for improving productivity cannot be freely performed.

Specifically, in the electric servo press machine combined with the crank mechanism or the like, the torque of the motor is amplified, into the theoretically infinite pressure force in the vicinity of BDC. The torque is amplified with an exponential degree of fluctuation with respect to a change in angle of the crankshaft 15. Therefore, it is difficult to perform the precise feedback control by using the signal of the load sensor 33, and in addition, the error with respect to the change in angle of the crankshaft 15 becomes remarkably large. Therefore, in actual conditions, the aforementioned full-closed control method cannot be used in the vicinity of BDC.

Accordingly, with the electric servo press combined with the crank mechanism or the like, it is difficult to employ the full-closed control (control for reducing the difference between the actual pressure force and the target value, which is obtained by the comparison) in the vicinity of BDC. The difficulty in use of the full-closed control even makes it difficult to realize the precise pressure-force control in the vicinity of BDC.

In the present invention, however, the motions for various types of processing can be freely performed by using the positional control or the speed control as in the case of the conventional electric servo presses. Further, the pressure force of the slide 13 is observed by the load sensor 33 during the speed control. When the slide 13 comes close to BDC and the actual pressure force reaches the target value (800 kN in this case), the control is switched to the torque control for maintaining the pressure force equal to the target value. Therefore, the pressure force can be controlled with high accuracy even in the vicinity of BDC.

In the operation example described above, the slide can be operated at the high speed under the positional control in Step 1 carried out before the start of processing and Step 5 corresponding to a return step after the processing. Therefore, the cycle time of one processing stroke can be reduced to improve the productivity. Moreover, the slide 13 can be precisely stopped at the standby position because the positional control is performed in Step 5. Accordingly, the cooperative operation with a peripheral device such as a material introduction device can be precisely performed.

Moreover, although [method] and [value] of [step shift] in Step 4 in the motion setting illustrated in FIG. 7 are [T] and [2.5 seconds], [method] can also be set to [M: moving distance after the step shift to the current step]. For example, when [method] and "value" of [step shift] are [M] and "3", the processing proceeds to Step 4 where the pressure is applied with the pressure force [F4] while the servo motor 30 is controlled under the torque control. Then, after the slide is lowered by 3 mm, Step 4 is terminated. Then, the processing proceeds to the next step. By performing the setting, the position of the slide 13 at the completion of the processing can be determined. Therefore, the processing with high dimensional accuracy can be performed.

Further, [method] of [step shift] in Step 4 in the motion setting can be set to [IN: external input signal]. For example, although not illustrated when [method] and "value" are set to [IN] and "3", the step shift to the next step can be performed by the signal externally input by a limit switch which is connected to an input channel 3 of the control device 41 and is mounted to, for example, the dies.

The motions illustrated in FIGS. 7 and 8 can be varied by using [auxiliary] function. The contents of the variations using [auxiliary] function are illustrated in FIGS. 11 and 12.

In comparison with the motion setting illustrated in FIG. 7, [Vib] is additionally set in [auxiliary 1] field of Step 4 in FIG. 11. The function [Vib] acts at the time of control of the pressure force. The function [Vib] is for temporarily reducing the pressure force at a preset ratio (ratio (%) with respect to the set pressure force [F4] in Step 4 of the operation example 1), then increasing, and reducing and increasing the pressure force again. The function is for repeating the reduction and increase of the pressure force within a cycle time which is also preset.

Figure 12:
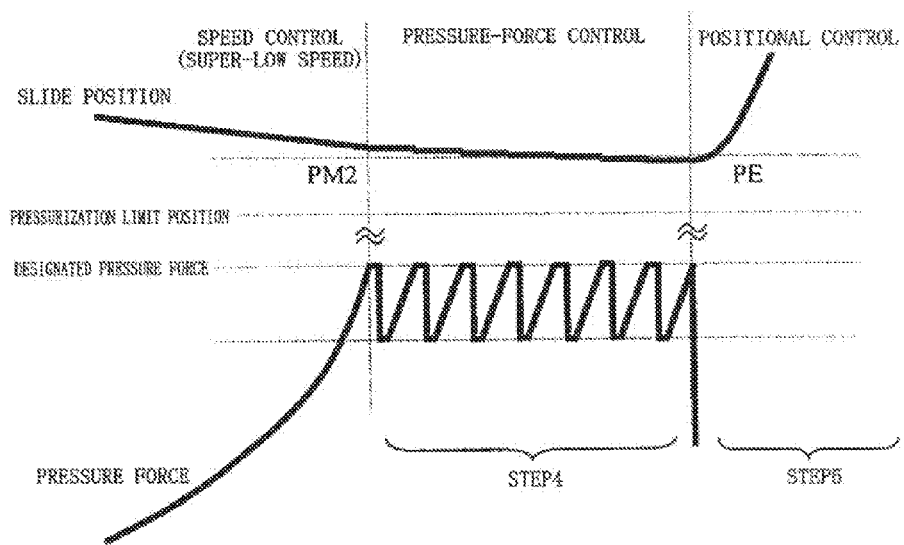
FIG. 12 is a timing chart with the horizontal axis representing time, which shows a state where the slide operates according to the contents set on the motion setting screen shown in FIG. 11.

FIG. 12 is a view featuring Step 4 illustrated in FIG. 8. In the lower part of FIG. 12, how the pressure force changes is additionally illustrated. After the pressure force reaches 100% of the designated pressure force Fm in Step 3, the processing proceeds to Step 4. In Step 4, the pressure control is started with the pressure force [F4]. Then, the pressure force is reduced at the preset rate and is then increased again to apply the pressure force [F4]. After that, the pressure force is reduced again. The aforementioned operation is repeated. Then, when conditions for the step shift are satisfied, the processing proceeds to the next step. In the setting illustrated in FIG. 11, the conditions for [step shift] are set to [T] and [2.5 seconds]. Therefore, after the elapse of 2.5 seconds, Step 4 is terminated and the processing proceeds to Step 5. In Step 5, the slide 13 is returned to the standby position PS by the reverse rotation of the servo motor 30. Therefore, a direction of the driving force is switched to negative (reverse rotating direction).

The oscillating changes in pressure force as described above can contribute to the realization of stable product quality in, for example, powder molding.

Operation Example 2

Figure 10:
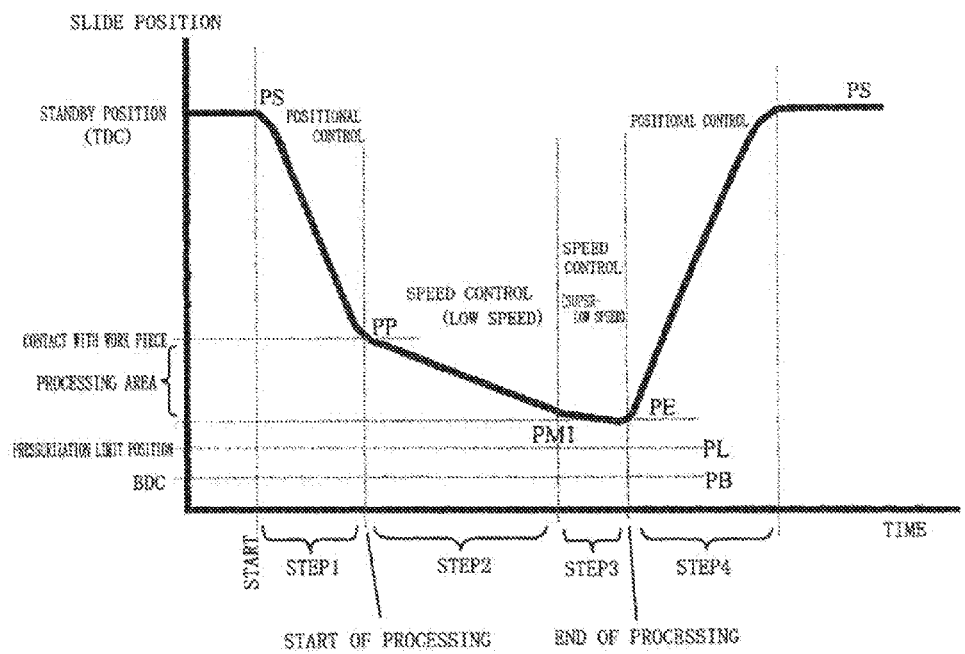
FIG. 10 is a timing chart having the horizontal axis representing time, which shows a state where the slide operates according to the contents set on the motion setting screen shown in FIG. 9.

An operation example 2 according to the present invention is described referring to FIGS. 9 and 10.

The operation example 2 is an example where the pressure-force determination device 60 is more positively used. FIG. 9 illustrates an example of setting performed on the motion setting screen, and FIG. 10 illustrates the operation of the slide 13 according to the setting.

The activation is performed by pressing the start button of the electric servo press 10 as in the case of the operation example 1. The servo motor drive controller 50 starts driving the servo motor 30 under the positional control so as to drive and lower the slide 13 from the standby position PS at the speed [V1]. The speed [V1] is set high as in the case of the operation example 1 so that the time required for one processing stroke is reduced to improve the productivity.

In FIG. 9, [method] and [value] of [step shift] in Step 1 are set to [F] and [10%]. Therefore, the step shift is performed by the pressure-force achievement signal of the pressure-force determination device 60. In the setting, 10% of the designated pressure force Fm (800 kN in this setting) is set as the pressure-force setting value of the pressure-force determination device 60. When the pressure force reaches the pressure-force setting value (10%) of the pressure-force determination device 60 (PP illustrated in FIG. 10) with the descent of the slide 13, the first pressure-force achievement signal is output to terminate Step 1. Then, the processing proceeds to Step 2.

The value of [step shift] is set to [10%] in this step so as to detect a point at which the upper die and the lower die come into contact with each other as a result of the descent of the slide 13 to allow the processing to be started. Therefore, the value of [step shift] is set to a small value without causing an erroneous operation by noise or the like. Therefore, the value of [step shift] may be, for example, about [5%] without any problem.

In Step 2, the control is switched to the speed control as in the case of the operation example 1 so that the slide 13 is driven to be lowered at the speed [V2] which is set as the processing speed with the dies. On the other hand, [method] and [value] of [step shift] are set to [F] and [70%]. Therefore, the step shift is performed by the pressure-force achievement signal of the pressure-force determination device 60. In this step, [value] is set to [70%]. Therefore, when the pressure force of the slide 13 reaches 70% of the designated pressure force Fm, the pressure-force determination device 60 outputs the second pressure-force achievement signal. Then, the shift from Step 2 to Step 3 is made.

In Step 3, the servo motor drive controller 50 continuously performs the speed control. However, the speed command section 47 switches the speed command so as to drive the slide 13 at the speed [V3]. As the set speed [V3], a super-low speed which is little affected by coasting of the slide 13 or the dies due to inertia (motion due to inertia) and enables an immediate shift to the next step.

In Step 3, [method] and [value] of [step shift] are respectively set to [F] and [100%]. The designated pressure force Fm is set to 800 kN. Therefore, when the pressure force becomes equal to 100% of the designated pressure force Fm, that is, 800 kN, the pressure-force determination device 60 outputs the fourth pressure-force achievement signal. Then, Step 3 is terminated to complete the processing. Then, the shift from Step 3 to Step 4 corresponding to the step of returning the slide 13 is made.

In Step 4, the servo motor 30 is rotated at the speed [−V1], that is, is reversely rotated under the positional control so that the slide 13 is raised at the speed [V1] and is returned to the standby position PS to stop there, as in Step 5 of the operation example 1. By the aforementioned steps, one processing stroke is completed.

In this operation example 2, the driving of the servo motor 30 is controlled while the way (method, mode, and content) of controlling the servo motor 30 is switched by the pressure-force achievement signals of the pressure-force determination device 60 in all the steps during the processing. In particular, around the end of Step 3, at which the processing is completed with the pressure force increased to maximum, the slide 13 is operated at the super-low speed so that the servomotor 30 immediately starts rotating reversely to raise the slide 13 when the pressure force reaches the designated pressure force Fm. Therefore, the pressure force does not exceed the designated pressure force Fm, and therefore precise pressure-force control can be realized.

Although Step 4 (so-called "restriking" step) in the operation example 1 is not included in the operation example 2, it is apparent that the "restriking" step can be provided in the operation example 2.

[For Operation Examples 1 and 2]

In the control on the servo motor, a rapid change in speed at the time of activation or step shift is not preferred because such a rapid change in speed generates a large oscillation or impact. For changing the speed, the speed is not changed instantaneously. Instead, so-called "S-curve" processing is used. In the "S-curve" processing, a certain period of time is provided so that the speed is continuously reduced (or increased) within the certain period of time so as to eliminate the impact. Although the detailed description thereof is omitted, the "S-curve" processing is performed even in this embodiment. In FIG. 8 corresponding to the operation example 1 and FIG. 10 corresponding to the operation example 2, the control is performed so that a smooth curve is obtained at each speed-changing point.

On the other hand, in the operation example 2, it is difficult to smoothly change the speed at the processing start position PP corresponding to a point of transition from Step 1 to Step 2 and the processing intermediate position PM1 corresponding to a point of transition from Step 2 to Step 3.

The reason for the aforementioned difficulty in smoothly changing the speed is as follows. Even if the speed reduction is started after the processing start position PP is detected by the first pressure-force achievement signal, the processing is already started. Therefore, there is no time long enough to reduce the speed. More specifically, the dies and the material actually abut against each other at the high speed [V1] when the first pressure-force achievement signal is output, and therefore the processing is already started.

Thus, the speed is required to be instantaneously reduced. A large impact is generated by the collision between the dies and the material and the rapid speed reduction at this time. In order to avoid the generation of the large impact, it is necessary to reduce a difference between the speed [V1] of Step 1 and the speed [V2] of Step 2. The same is applied to the processing intermediate position PM1 corresponding to the point of transition from Step 2 to Step 3.

On the other hand, the speed [V3] of Step 3 is required to be set super-low so as to avoid the overshoot of the pressure force at the time of completion of the processing, that is, so that the reverse rotation of the servo motor 30 (rise of the slide 13) can be immediately started. Therefore, the speeds [V1] and [V2] cannot be set as high as desired. As a result, the productivity is inevitably lowered. In the operation for adjusting the dies and the operation for die tryout, in which the productivity is not regarded as extremely important, however, the motion setting is easy. Thus, the aforementioned operation example is effective.

On the other hand, at the processing start position PP corresponding to the point of transition from Step 1 to Step 2 and the processing intermediate position PM1 corresponding to the point of transition from Step 2 to Step 3 in the operation example 1, [step shift] is performed based on [P], that is, "distance from BDC". Therefore, [value] thereof, that is, "distance from BDC" is set larger in advance for a distance required for the speed reduction with the "S-curve" processing. As a result, the processing start position at which the upper die actually comes into contact with the material, the speed is already changed to the speed [V2] of Step 2 to allow a smooth operation. In addition, the speed [V1] of Step 1 can be increased. The same is applied to the processing intermediate position PM1 corresponding to the point of transition from Step 2 to Step 3. Thus, the operation example 1 is frequently used in the actual production because the productivity can be remarkably improved. It is apparent that Step 4 is omitted in the operation example 1 when "restriking" operation is not required.

[Test Operation]

As described above, with the operation example 1, the productivity can be increased. On the other hand, however, a calculation for the distance required for the speed reduction is needed, and therefore the motion setting is complicated.

By performing a test operation, some parameters of the motion setting can be automatically set. The contents of the test operation are now described referring to FIGS. 4, 5, and 13.

FIG. 13 illustrates a screen of the operating section 43 when the test operation is performed. Although the contents of the screen are the same as those for the motion setting in the operation example 1, shaded fields on the screen are input fields in which parameters can be automatically set.

For example, when a symbol [?] is previously entered in the shaded fields, the parameters are automatically set by performing the test operation. It is apparent that the parameters can also be set manually. For example, the input fields for the positional control of Steps 1 and 5 are shaded in this case. The input fields are processed as parameters determined by manual input because [V1] and [V2] are entered as speed setting values.

Before the test operation, a storage area illustrated in FIG. 5 is created in the motion setting information storage section 42.

The designated pressure force Fm is set on the screen of the test operation illustrated in FIG. 13. Therefore, values corresponding to 10%, 50%, 55%, 60%, . . . , and 105% are calculated and generated as the pressure-force setting values. The thus generated values are transmitted to the pressure-force determination device 60.

The test operation is performed by driving the slide 13 at the super-low speed. Although the super-low speed is set to 2% of the maximum speed in this embodiment, the super-low speed can be generally set up to about 10% of the maximum speed.

The press working is performed while the slide 13 is driven at the super-low speed in the test operation. Meanwhile, the pressure-force determination device 60 generates the pressure-force achievement signal when the pressure force becomes equal to each of the pressure-force setting values. Based on the pressure-force achievement signal, the control device 41 stores the crank angle position obtained at that time in association with the corresponding pressure-force setting value in the storage area illustrated in FIG. 5. Further, the slide position is calculated from the crank angle position to complete the table shown in FIG. 5.

Figure 4:
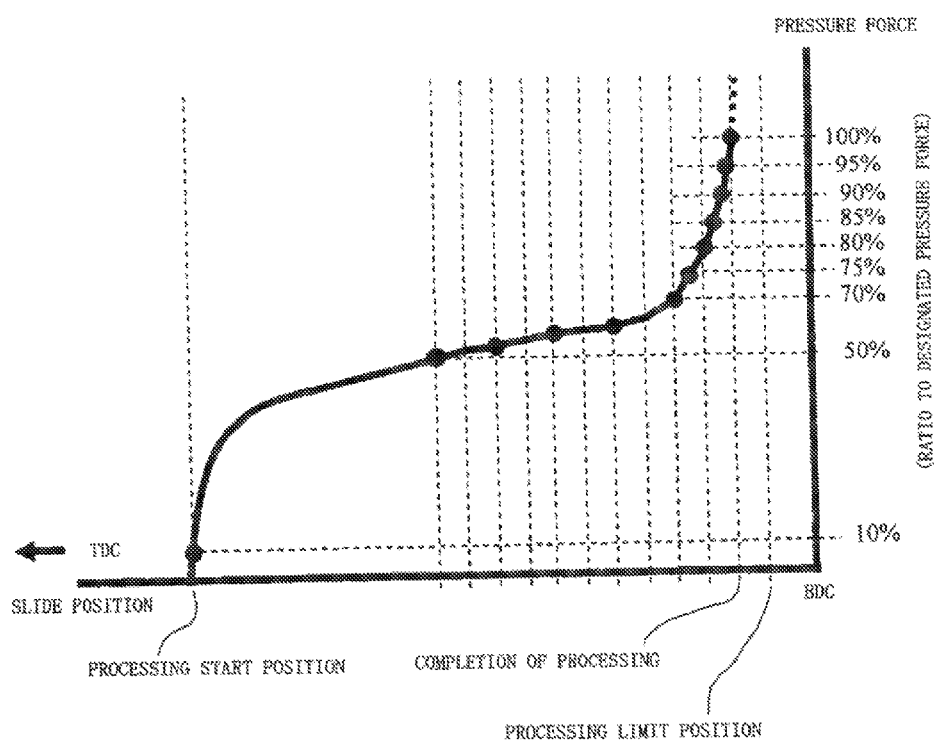
FIG. 4 is a graph obtained by plotting a pressure force at each slide position (crank angle position) for one of representative processing examples of press working.

FIG. 4 is a graph obtained by plotting each pressure force at each slide position, for one of representative processing examples of the press working.

Filled circles shown in FIG. 4 correspond to measurement points according to the table of FIG. 5, which are obtained by the test operation. With the descending operation, the slide 13 reaches the processing start point at which the upper die 21, and the material and the lower die 22 come into contact with each other. Then, the pressure force is rapidly increased. After that, the processing is continued with about 50% of the designated pressure force. When the slide 13 comes closer to the processing completion position, the pressure force is rapidly increased. When the pressure force reaches 100%, the processing is completed. The pattern of the pressure force as described above is a representative pattern for the closed-die forging process requiring the pressure-force control.

The parameters of the motion setting are determined based on data obtained by the test operation. A slide position P10 corresponding to the pressure-force setting value 10% on the table of FIG. 5 is the processing start point. [Value] of [step shift] of Step 1 illustrated in FIG. 13, that is, the step shift position PP can be determined by obtaining a distance necessary for the speed reduction from the speed [V1] of Step 1 to the speed [V2] of Step 2 at a preset deceleration rate and then adding the obtained distance to the processing start point (P10 illustrated in FIG. 5).

Determined as [value] of [step shift] of Step 2, that is, determined as the step shift position PM1 is a position which allows the speed to be reduced to the super-low speed [V3] corresponding to the speed of Step 3 before the designated pressure force Fm corresponding to the condition for the step shift in Step 3 becomes 100%, that is, before the completion of the processing. A distance necessary for the speed reduction from the speed [V2] of Step 2 to the speed [V3] of Step 3 is obtained with respect to a position P100 at which the pressure force becomes equal to 100% of the designated pressure force Fm. By adding the obtained distance to the processing completion position (PM2 shown in FIG. 8 or PE shown in FIG. 10), the step shift position is obtained. As described above, determined as the step shift position PM1 of Step 2 is the position which allows the speed to be fully reduced to the speed [V3] of Step 3 between the step shift to Step 3 and the subsequent speed reduction, and the completion of Step 3. It is apparent that a margin value is added for the calculation of each of the step shift positions PP and PM1 as needed.

Further, the speed [V1] of Step 1 before the processing start point and the speed [−V] of Step 5 corresponding to the return step can be automatically set. The speeds of Steps 1 and 5 described above are not required to be set low because the speeds are not directly related with the processing. In general, the maximum speed of the press machine is automatically set as each of the speeds described above. It is apparent that the "S-curve" processing is performed at the time of stop of activation or at the time of speed increase/reduction to perform smooth speed increase/reduction even if the maximum speed is set.

On the other hand, when the introduction or extraction of the material are performed by an automatic conveying device, one processing stroke is continuously performed. Therefore, the automatic conveying device is introduced between the dies to convey the material during Step 1 or 5. Therefore, a time period for each of Steps 1 and 5 is required to be determined in consideration of an operating time of the automatic conveying device. In this case, [V1] of Step 1 and [−V1] of Step 5 should be inevitably set manually.

[In the Case of Processing with Large Processing Energy]

The press working includes various types of processing. Among various types of processing, there is a type of processing requiring extremely large processing energy.

In this embodiment, the capacitor 75 is provided as the energy storage device. Therefore, the stored energy is used to perform the processing in the case of general processing. In the case of the processing with extremely large processing energy, however, energy shortage sometimes occurs before the completion of processing. A behavior in the case of energy shortage is described referring to FIG. 15.

When (VP1 shown in FIG. 15) the electric servo press 10 is activated, the energy is consumed, and therefore a voltage of the energy storage capacitor 75 is gradually lowered. When the voltage becomes equal to or lower than the specified voltage 1 (VP2 shown in FIG. 15), the servo motor drive controller 50 stops driving the servomotor 30. Thus, the energy consumption is interrupted. When the driving of the servo motor 30 is not stopped, the voltage continues dropping as indicated by a broken line shown in FIG. 15 to become equal to or lower than an abnormal stop voltage. As a result, the electric servo press 10 makes an abnormal stop.

In this embodiment, the voltage determination device 44 is provided to the press controller 40 so that the voltage of the energy storage capacitor 75 is monitored. Therefore, the servo motor drive controller 50 is controlled so that the voltage drop signal is output to the control device 41 to place the servo motor 30 in a stop state by a command from the control device 41 when the voltage of the energy storage capacitor 75 becomes equal to or lower than the specified voltage 1.

As a result, the energy is scarcely consumed. In addition, DC power is supplied from the converter 73 to the energy storage capacitor 75. Thus, the voltage recovers while the energy is stored. When the voltage recovers to be equal to the specified voltage 2, the voltage determination device 44 outputs the voltage rise signal to the control device 41. Then, the control device 41 releases the stop state of the servo motor 30 so that the driving of the servo motor 30 is started again.

In some cases, a temporary stop at an arbitrary position during the press working as described above is not preferred in view of the press working. Therefore, in this embodiment, the temporary stop clue to the energy shortage is made only at the time of the shift to the next step.

[Slide Adjustment Command]

The test operation allows the determination of whether or not the positional adjustment of the slide (die-height adjustment) is required.

Figure 14:
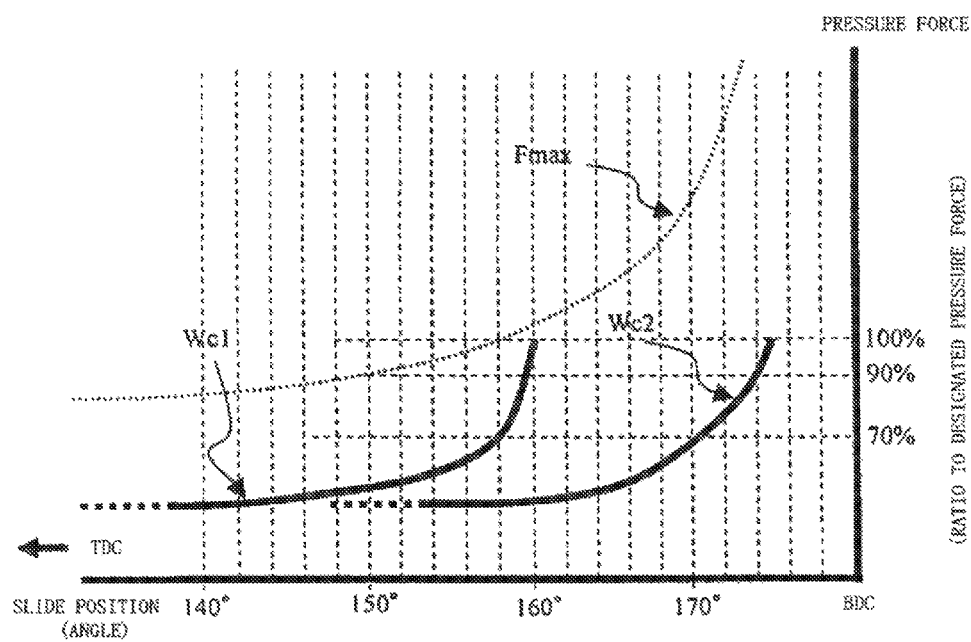
FIG. 14 is a graph showing the relation between a change in pressure and a curve showing press performance with respect to the crank angle position in the case where the adjustment of the slide position (die-height adjustment) is performed in the same processing.
Figure 15:
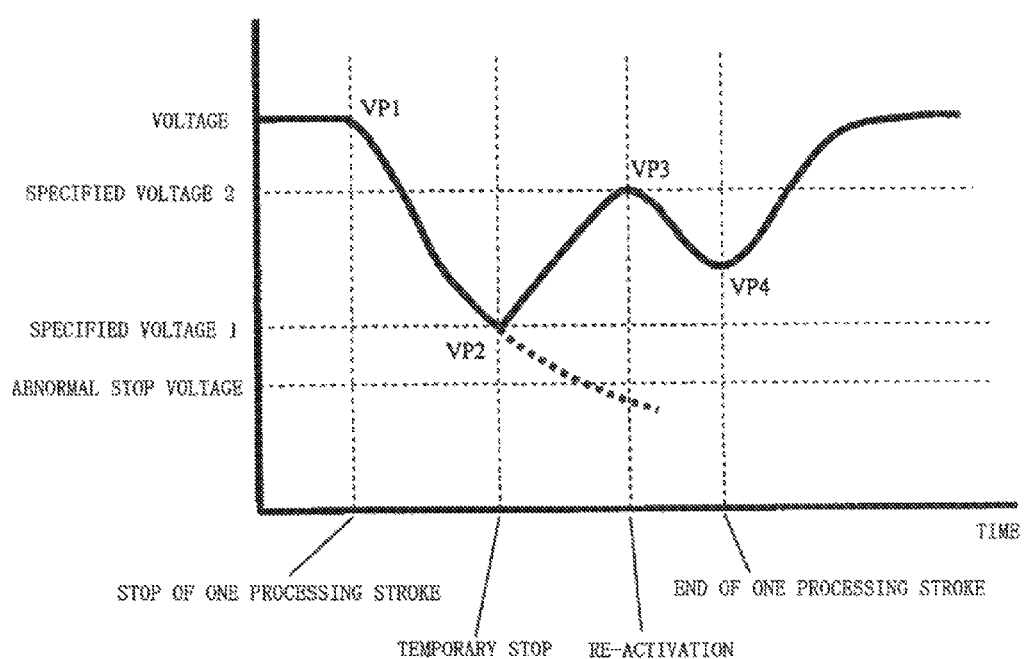
FIG. 15 is a graph showing a state of a voltage at both ends of an energy storage capacitor when processing requiring a large energy is performed.

FIG. 14 is a graph showing a processing example, which has the horizontal axis representing the rotational angle position of the crankshaft 15 and the vertical axis representing the pressure force.

A curve Fmax is a performance curve of the press machine and indicates a maximum pressure force which can be generated at each crank angle position.

A curve Wc1 indicates the pressure force in the case where the position of the slide is adjusted so that the processing is completed in the vicinity of the crank angle position of 160°.

A curve Wc2 indicates the pressure force in the case where the same processing is performed with the same dies. However, the curve Wc2 indicates the pressure force when the position of the slide (die-height) is adjusted to be higher than that of the example indicated by the curve Wc1 so that the processing is completed around the crank angle position of 175°, which is closer to BDC. Both processing cases indicated by the curves Wc1 and Wc2 are present below the performance curve Fmax, and therefore the processing is possible. However, the processing with the curve Wc2 provides a larger margin for the operation of the electric servo press 10.

Further, the processing with the curve Wc2 has a gentler increase of the pressure force around the crank angle position of 175° at which the processing is completed. Accordingly, a variation in pressure force with respect to the amount of motion (amount of rotation) of the crankshaft 15 is small.

With a smaller variation in pressure force, an extremely small amount of coasting (motion due to inertia) of the crankshaft 15, from the detection of the pressure force of 100% to the output of the pressure-force achievement signal to switch between the control by the servo motor drive controller 50 and the control by the motion command device 45, can suppress the variation in pressure force, which corresponds to the amount of coasting, that is, overshoot. Thus, as compared with the control indicated by the curve Wc1, under which the processing is completed around the crank angle position of 160°, the control on the pressure force with high accuracy can be performed.

On the other hand, around the crank angle position of 175° to 180° in the vicinity of BDC, the slide 13 scarcely moves with respect to the rotation angle of the crankshaft 15. On the other hand, the extension of the frame 11 due to temperature or the like greatly affects the control. Therefore, the pressure force is not sufficiently controlled. Accordingly, the adjusted position of the slide, which is suitable for the processing, is automatically determined. In this embodiment, the processing completion position corresponding to the crank angle position of 165° to 175° F. is determined as a suitable slide position. At the crank angle position smaller than 165°, display is made to raise the slide position for adjustment. On the other hand, at the crank angle position larger than 175°, display is made to lower the slide position for adjustment. For the processing with a gentle increase in pressure, which is performed in the vicinity of the completion of the processing, the suitable range of the slide adjustment can be enlarged.

As described above, according to the controller for the electric servo press of this embodiment, the pressure force can be precisely controlled even for the press machine using the eccentric mechanism such as the crankshaft, which can be employed in the large-sized press machines. In particular, in the vicinity of BDC, the problem of inevitable imprecision of the pressure-force control on the slide by the torque control performed on the servo motor is overcome to enable the precise control of the pressure force even in the vicinity of BDC.

As a result, the closed-die forging process and the powder molding, which require the use of the hydraulic press so far, can be performed. Therefore, the press machine having a wide range of use can be provided. Further, the servo motor is driven while the control is appropriately switched not only to the torque control but also to the positional control or the speed control. Therefore, the productivity can be remarkably improved as compared with that of the hydraulic press, and the productivity equal to that, of the mechanical press can be expected. Further, some of the parameters relating to the motion setting can be automatically set. Therefore, the press machine excellent in operability can be provided.

The embodiment described above is merely an example for illustrating the present invention.

Besides the above, various changes and modifications can be made without departing from the spirit and scope of the present invention.

What is claimed is:

1. A controller for an electric servo press for linearly driving a slide through a rotary-to-linear motion converting mechanism for rotating a decentering shaft by a rotational output of a servo motor to convert a rotation of the decentering shaft into a linear motion, to perform press working, the controller comprising: a press load sensor for detecting a pressure-force of the slide; a pressure-force determination device for determining whether the pressure-force of the slide reaches one or a plurality of different pressure-force setting values based on the one or the plurality of different pressure-force setting values and an output signal of the press load sensor, and for generating a pressure-force achievement signal each time the pressure-force of the slide reaches each of the one or the plurality of different pressure-force setting values; a servo motor drive controller for controlling the servo motor; and a motion command device configured to provide the servo motor drive controller with a motion command, wherein when a stroke of the electric servo press starts at one of a standby position and a top dead center (PS) of the slide, the motion command device is configured to provide a motion command to the servo motor drive controller to control the servo motor by a positional control, the motion command device is configured to provide a motion command to the servo motor drive controller to switch a drive control mode for the servo motor from the positional control to a speed control, in response to a first pressure-force achievement signal to be generated at an actual processing start point at which predetermined pressure-force is generated between an upper die and a lower die, the motion command device is configured to provide a motion command to the servo motor drive controller to lower a rotating speed of the servo motor, in response to a second pressure-force achievement signal to be generated when a pressure-force greater than the predetermined pressure-force is generated between the upper die and the lower die, while the servo motor drive controller is performing the speed control on the servo motor, and the motion command device is configured to provide a motion command to the servo motor drive controller to switch the drive control mode for the servo motor from the speed control to a torque control, in response to a third pressure-force achievement signal to be generated when a maximum pressure-force is generated between the upper die and the lower die.

2. The controller for an electric servo press according to claim 1, wherein the controller performs the torque control for converting a pressure-force command value for the slide into a torque command value for the servo motor based on a relation between a torque generated by the servo motor and the pressure force of the slide with respect to a rotational angle position of the decentering shaft of the rotary-to-linear motion converting mechanism of the electric servo press and outputting the torque command value to the servo motor drive controller as a torque command value (Cit).

3. The controller for an electric servo press according to claim 1, wherein
when the drive control mode is switched from the speed control to the torque control, a torque value to be used to control the servo motor under the speed control at the time when the third pressure-force achievement signal is generated is utilized to generate an initial value for a torque command value (Cit) of the torque control.

4. The controller for an electric servo press according to claim 1, wherein when the controller performs the torque control, a pressure-force command value output from the motion command device is temporarily reduced to be lower than a preset value and then increased to an original value, and by repeating the reduction and increase of the pressure-force command value, the pressure-force of the slide is oscillated.

5. The controller for an electric servo press according to claim 1, wherein it is determined that the press working is completed based on an output of a fourth pressure-force achievement signal, and then, the drive control mode of the servo motor is switched to the positional control so that the servo motor is reversely rotated to return the slide to one of a standby position and a top dead center (PS).

6. The controller for an electric servo press according to claim 1, wherein when a preset time elapses after switching to the torque control, it is determined that the press working is completed, and then, the drive control mode for the servo motor is switched to the positional control so that the servo motor is reversely rotated to return the slide to one of a standby position and a top dead center (PS).

7. The controller for an electric servo press according to claim 1, wherein when a moving distance of the slide after switching to the torque control becomes equal to a preset distance, it is determined that the press working is completed, and then, the drive control mode for the servo motor is switched to the positional control so that the servo motor is reversely rotated to return the slide to one of a standby position and a top dead center (PS).

8. The controller for an electric servo press according to claim 1, wherein if an amount of energy stored in an energy storage device functioning as a drive source of the servo motor is equal to or less than a specified amount when the servo motor drive controller switches the drive control mode or the motion command device provides a motion command to the servo motor drive controller, the driving of the servo motor is temporarily stopped, and when the amount of stored energy is increased to the specified value again, the driving of the servo motor is restarted.

9. The controller for an electric servo press according to claim 1, wherein: the electric servo press is configured so as to be able to operate in a test operation mode in which the electric servo press is operated while the slide is operated at a speed lower than a normal production speed; a plurality of different pressure-force setting values are set for the pressure-force determination device; the controller further comprises a storage device for storing a corresponding slide position in association with the pressure-force setting value when the pressure-force reaches each of the plurality of different pressure-force setting values; the electric servo press is operated in the test operation mode so that each of the slide positions is stored in the storage device; and based on the stored slide positions, at least one parameter relating to the motion commanded by the motion command device is automatically determined.

10. The controller for an electric servo press according to claim 1, wherein:
the electric servo press is configured so as to be able to operate in a test operation mode in which the electric servo press is operated while the slide is operated at a speed lower than a normal production speed;
a plurality of different pressure-force setting values are set for the pressure-force determination device;
the controller further comprises a storage device for storing a corresponding slide position in association with the pressure-force setting value when the pressure force reaches each of the plurality of different pressure-force setting values;
the electric servo press is operated in the test operation mode so that each of the slide positions is stored in the storage device; and
based on the stored slide positions, it is determined whether or not an adjustment of the slide position (die-height adjustment) with respect to a rotational angle position of the decentering shaft of the rotary-to-linear motion converting mechanism is required.

11. A method for controlling an electric servo press for linearly driving a slide through a rotary-to-linear motion converting mechanism for rotating a decentering shaft by a rotational output of a servo motor to convert a rotation of the decentering shaft into a linear motion, to perform press working, the method comprising:
detecting a pressure force of the slide;
determining whether the pressure force of the slide reaches one or a plurality of different pressure-force setting values based on the one or the plurality of different pressure-force setting values and a detection value of the pressure force of the slide;
generating a pressure-force achievement signal each time the pressure force of the slide reaches each of the one or the plurality of different pressure-force setting values;

when a stroke of the electric servo press starts at one of a standby position and a top dead center (PS) of the slide, controlling the servo motor by a positional control;

switching a drive control mode for the servo motor from the positional control to a speed control, in response to a first pressure-force achievement signal to be generated at an actual processing start point at which predetermined pressure-force is generated between an upper die and a lower die;

lowering a rotating speed of the servo motor, in response to a second pressure-force achievement signal to be generated when a pressure-force greater than the predetermined pressure-force is generated between the upper die and the lower die, while the servo motor drive controller is performing the speed control on the servo motor; and switching the drive control mode for the servo motor from the speed control to a torque control, in response to a third pressure-force achievement signal to be generated when a maximum pressure-force is generated between the upper die and the lower die.

12. The method according to claim 11, wherein the torque control is performed for converting a pressure-force command value for the slide into a torque command value for the servo motor based on a relation between a torque generated by the servo motor and the pressure force of the slide with respect to a rotational angle position of the decentering shaft of the rotary-to-linear motion converting mechanism of the electric servo press and outputting the torque command value as a torque command value (Cit) to control the servo motor.

13. The method according to claim 11, wherein when the drive control mode is switched from the speed control to the torque control, a torque value to be used to control the servo motor under the speed control at the time when the third pressure-force achievement signal is generated is utilized to generate an initial value for a torque command value (Cit) of the torque control.

14. The method according to claim 11, wherein when the torque control is performed, a pressure-force command value output for the torque control is temporarily reduced to be lower than a preset value and then increased to an original value, and by repeating the reduction and increase of the pressure-force command value, the pressure force of the slide is oscillated.

15. The method according to claim 11, wherein it is determined that the press working is completed based on an output of a fourth pressure-force achievement signal, and then, the drive control mode of the servo motor is switched to the positional control so that the servo motor is reversely rotated to return the slide to one of a standby position and a top dead center (PS).

16. The method according to claim 11, wherein when a preset time elapses after switching to the torque control, it is determined that the press working is completed, and then, the drive control mode for the servo motor is switched to the positional control so that the servo motor is reversely rotated to return the slide to one of a standby position and a top dead center (PS).

17. The method according to claim 11, wherein when a moving distance of the slide after switching to the torque control becomes equal to a preset distance, it is determined that the press working is completed, and then, the drive control mode for the servo motor is switched to the positional control so that the servo motor is reversely rotated to return the slide to one of a standby position and a top dead center (PS).

18. The method according to claim 11, wherein if an amount of energy stored in an energy storage device functioning as a drive source of the servo motor is equal to or less than a specified amount when the drive control mode is switched, the driving of the servo motor is temporarily stopped, and when the amount of stored energy is increased to the specified value again, the driving of the servo motor is restarted.

19. The method according to claim 11, wherein: the electric servo press is configured so as to be able to operate in a test operation mode in which the electric servo press is operated while the slide is operated at a speed lower than a normal production speed; a plurality of different pressure-force setting values are set; a corresponding slide position is stored in association with the pressure-force setting value when the pressure-force reaches each of the plurality of different pressure-force setting values; the electric servo press is operated in the test operation mode so that each of the slide positions is stored in the storage device; and based on the stored slide positions, at least one parameter relating to the motion is automatically determined.

20. The method according to claim 11, wherein:
the electric servo press is configured so as to be able to operate in a test operation mode in which the electric servo press is operated while the slide is operated at a speed lower than a normal production speed;
a plurality of different pressure-force setting values are set;
a corresponding slide position is stored in association with the pressure-force setting value when the pressure force reaches each of the plurality of different pressure-force setting values;
the electric servo press is operated in the test operation mode so that each of the slide positions is stored in the storage device; and
based on the stored slide positions, it is determined whether or not an adjustment of the slide position (die-height adjustment) with respect to a rotational angle position of the decentering shaft of the rotary-to-linear motion converting mechanism is required.

* * * * *